(12) United States Patent
Del Agua Hernandez

(10) Patent No.: US 10,336,886 B2
(45) Date of Patent: Jul. 2, 2019

(54) IMPACT PERFORMANCE MODIFIED HIGH TRANSPARENT MELT POLYMERIZED POLYCARBONATE

(71) Applicant: SABIC Global Technologies B.V., Bergen op Zoom (NL)

(72) Inventor: David Del Agua Hernandez, Murcia (ES)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 0 days.

(21) Appl. No.: 15/775,233

(22) PCT Filed: Nov. 10, 2016

(86) PCT No.: PCT/IB2016/056783
§ 371 (c)(1),
(2) Date: May 10, 2018

(87) PCT Pub. No.: WO2017/081640
PCT Pub. Date: May 18, 2017

(65) Prior Publication Data
US 2018/0371208 A1 Dec. 27, 2018

(30) Foreign Application Priority Data
Nov. 13, 2015 (EP) .................................. 15382564

(51) Int. Cl.
| | | |
|---|---|---|
| C08G 64/04 | (2006.01) | |
| C08K 5/103 | (2006.01) | |
| F21V 3/06 | (2018.01) | |
| C08K 5/134 | (2006.01) | |
| C08K 5/3475 | (2006.01) | |
| C08K 5/42 | (2006.01) | |
| C08K 5/526 | (2006.01) | |
| C08K 5/50 | (2006.01) | |
| F21V 5/00 | (2018.01) | |
| G02B 1/04 | (2006.01) | |

(52) U.S. Cl.
CPC .............. *C08K 5/103* (2013.01); *C08G 64/04* (2013.01); *C08K 5/1345* (2013.01); *C08K 5/3475* (2013.01); *C08K 5/42* (2013.01); *C08K 5/50* (2013.01); *C08K 5/526* (2013.01); *F21V 3/0625* (2018.02); *F21V 5/00* (2013.01); *G02B 1/041* (2013.01)

(58) Field of Classification Search
USPC .................................. 524/91; 528/196, 198
See application file for complete search history.

(56) References Cited

U.S. PATENT DOCUMENTS

| | | |
|---|---|---|
| 5,504,177 A | 4/1996 | King, Jr. et al. |
| 5,959,065 A | 9/1999 | Heuschen et al. |
| 6,066,700 A | 5/2000 | Konig et al. |
| 2003/0189838 A1 | 10/2003 | Schottland |
| 2014/0093673 A1 | 4/2014 | Fernandez et al. |
| 2014/0094545 A1 | 4/2014 | Roncaglia et al. |
| 2014/0094550 A1 | 4/2014 | Diaz et al. |

FOREIGN PATENT DOCUMENTS

| | | |
|---|---|---|
| EP | 2937371 A1 | 10/2015 |
| KR | 10-2015-0063074 A | 6/2015 |
| KR | 10-2015-0065724 A | 6/2015 |
| KR | 10-2015-0065774 A | 6/2015 |
| WO | 2015132740 A1 | 9/2015 |

OTHER PUBLICATIONS

International Patent Application No. PCT/IB2016/056783; Int'l Search Report and the Written Opinion; dated Feb. 6, 2017; 12 pages.
Weijun Zhou, John Osby, "Siloxane Modfication of Polycarbonate For Superior Flow And Impact Toughness," Polymer, vol. 51, Issue 9, Apr. 20, 2010, pp. 1990-1999.
International Patent Application No. PCT/IB2016/056783; Int'l Preliminary Report on Patentability; dated May 24, 2018; 8 pages.

*Primary Examiner* — Terressa Boykin
(74) *Attorney, Agent, or Firm* — Baker Hostetler LLP

(57) ABSTRACT

Disclosed herein are articles formed from polycarbonate prepared according to a melt polymerization method. The disclosed articles may include a composition comprising a melt polycarbonate resin derived from diphenyl carbonate; and glycerol tristearate mixed with the melt polycarbonate resin. The resulting articles exhibit mechanical properties improving upon articles formed from polycarbonate prepared according to conventional melt polymerization processes and are comparable to the mechanical properties apparent in articles prepared from interfacial polycarbonate compositions. Methods of preparing the melt polycarbonate composition are further disclosed herein.

19 Claims, 10 Drawing Sheets

US 10,336,886 B2

IMPACT PERFORMANCE MODIFIED HIGH TRANSPARENT MELT POLYMERIZED POLYCARBONATE

CROSS-REFERENCE TO RELATED APPLICATION

This application is the National Stage of International Application No. PCT/IB2016/056783 filed Nov. 10, 2016, which claims the benefit of European Application No. EP15382564.1 filed Nov. 13, 2015, the disclosures of which are incorporated herein by this reference in their entireties.

TECHNICAL FIELD

The disclosure concerns methods for producing polycarbonate according to melt polymerization processes.

BACKGROUND

Polycarbonates are used in a number of industries for a variety of applications owing to their versatility and desirable properties. Polycarbonates provide high transparency and are esteemed for high impact and high heat resistance. Polycarbonates are generally produced according to one of two commercial production methods: a two-phase interfacial process and a melt transesterification process. The interfacial method comprises the reaction of at least one dihydroxy compound, generally a dihydroxyaromatic compound, with phosgene in a solvent, in the presence of a basic reagent as acid acceptor and an amine as catalyst. Melt transesterification processes are well known in the art for producing polycarbonate by reacting a diaryl carbonate and a dihydroxy compound in the optional presence of transesterification catalysts. Other potentially useful methods tend to be direct variations on, or simple combinations of, these two primary processes.

SUMMARY

The polymerization process and molding conditions used to produce the polycarbonate may determine the characteristics of the resultant polycarbonate. Melt polymerization processes may suffer from a Fries rearrangement product, or natural intercrossing of the melt polycarbonate, which may reduce mechanical properties of the resultant polycarbonate composition. Thus, it would be advantageous to provide a melt polymerization process yielding a transparent material, having good impact performance at a low temperature and comparable to the polycarbonate achieved according to an interfacial polymerization process.

Aspects of the present disclosure relate to an article formed from a composition comprising: a melt polycarbonate resin derived from diphenyl carbonate; and glycerol tristearate mixed with the melt polycarbonate resin, wherein the composition exhibits a melt volume rate of between about 18 cubic centimeters per 10 minutes ($cm^3/10$ min.) and about 22 $cm^3/10$ min., wherein the composition exhibits a fries concentration below about 800 parts per million (ppm), wherein the article formed from the composition exhibits an Izod impact performance between about 9.5 kilojoules per square meter ($KJ/m^2$) and about 13 $KJ/m^2$ based on ISO 180 at 4 millimeter (mm) thickness, and wherein the article formed from the composition exhibits transparency.

In yet other aspects, the present disclosure relates to a method comprising: forming a polycarbonate resin via melt transesterification; mixing glycerol tristearate with the polycarbonate resin to form a composition; forming an article from the composition, wherein the composition exhibits a melt volume rate of between about 18 $cm^3/10$ min. and about 22 $cm^3/10$ min., wherein the composition exhibits a fries concentration below about 800 ppm, and wherein the article formed from the composition exhibits an Izod impact performance between about 9.5 $KJ/m^2$ and about 13 $KJ/m^2$ based on ISO 180 at 4 mm thickness at room temperature.

While aspects of the present disclosure may be described and claimed in a particular statutory class, such as the system statutory class, this is for convenience only and one of skill in the art will understand that each aspect of the present disclosure can be described and claimed in any statutory class. Unless otherwise expressly stated, it is in no way intended that any method or aspect set forth herein be construed as requiring that its steps be performed in a specific order. Accordingly, where a method claim does not specifically state in the claims or descriptions that the steps are to be limited to a specific order, it is no way intended that an order be inferred, in any respect. This holds for any possible non-express basis for interpretation, including matters of logic with respect to arrangement of steps or operational flow, plain meaning derived from grammatical organization or punctuation, or the number or type of aspects described in the specification.

Additional aspects of the disclosure will be set forth in part in the description which follows, and in part will be obvious from the description, or can be learned by practice of the disclosure. The advantages of the disclosure will be realized and attained by means of the elements and combinations particularly pointed out in the appended claims. It is to be understood that both the foregoing general description and the following detailed description are exemplary and explanatory only and are not restrictive of the disclosure, as claimed.

BRIEF DESCRIPTION OF THE FIGURES

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
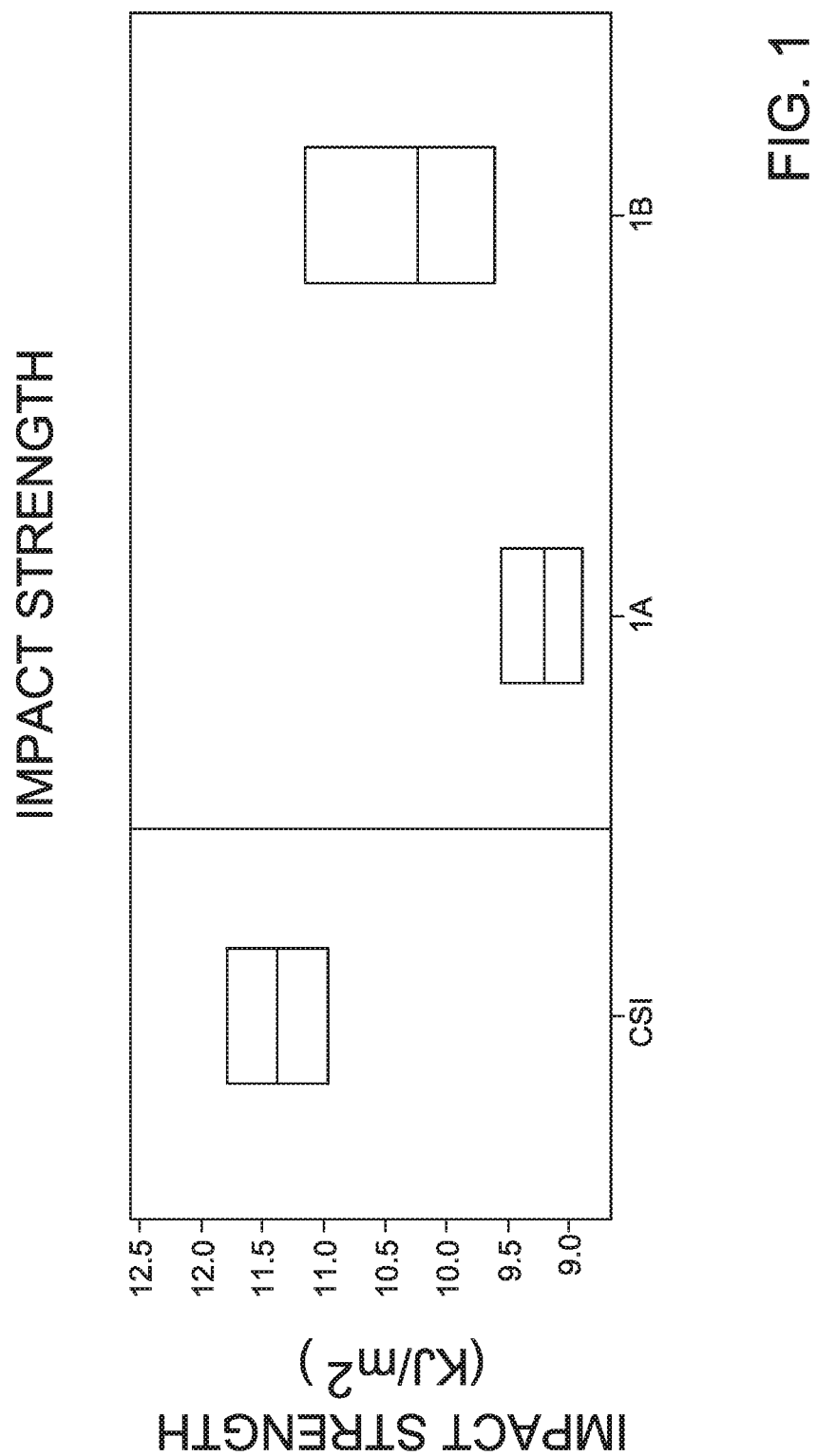
FIG. 1 is a graphical representation of impact performance data for comparative and/or example compositions according to aspects of the disclosure.

The articles formed according to the methods herein may comprise polycarbonate compositions prepared by a melt polymerization, or melt transesterification process. Compared to interfacial polymerization processes, the melt process obviates the need for phosgene during polymerization or a solvent such as methylene chloride. The melt process, however, typically also requires higher temperatures and relatively long reaction times. A melt polymerization process may also involve the use of complex processing equipment capable of operation at high temperature and low pressure capable of efficient agitation of the highly viscous polymer melt during the relatively long reaction times required to achieve a desired molecular weight. A given melt polymerization process may also feature increased Fries natural intercrossing which may increase rigidity of the resultant polycarbonate and ultimately reduce impact performance. While "high volume" end cappers may be used to improve the impact properties of the polycarbonate without a negative impact on transparency, these high volume end cappers are primarily used in interfacial polymerization processes. Though siloxane additives may be used in an interfacial polymerization process to provide transparent polycarbonate with good impact performance at low temperatures, siloxanes may add an undue cost and are not easily applied in melt polycarbonate polymerization processes (lower reactivity of the carbonate source, diphenyl carbonate). Accordingly, a melt polycarbonate resin exhibiting properties comparable to an interfacial polycarbonate resin would be desirable. The melt polycarbonate resins of the present disclosure exhibit properties comparable to interfacial polycarbonate resin where the melt polycarbonate is derived from diphenyl carbonate and mixed with glycerol tristearate to provide a polycarbonate resin exhibiting a melt volume rate of between about 18 cm$^3$/10 min. and 22 cm$^3$/10 min., a fries concentration below about 800 ppm. The melt polycarbonate resins disclosed herein may also form transparent articles exhibiting an Izod impact performance of from about 9.5 KJ/m$^2$ and about 13 KJ/m$^2$ based on ISO 180 at 4 mm thickness at room temperature.

The articles of the present disclosure may be formed from a melt transesterification polycarbonate which has been derived from diphenyl carbonate and combined with an addition of glycerol tristearate (GTS) to the formed melt polycarbonate. Generally, in a melt polymerization process, polycarbonates may be prepared by co-reacting, in a molten state, a dihydroxy compound(s) and a carbonate source, such as diphenyl carbonate, or more specifically in an aspect, an activated carbonate such as bis(methyl salicyl)carbonate, in the presence of a transesterification catalyst. In the melt polymerization process, the reaction mixture may comprise a melt transesterification catalyst, a dihydroxy compound, a carbonate source and a phenolic byproduct. More specifically, the polycarbonate may be produced by the melt transesterification reaction of a dihydroxy compound and diphenyl carbonate in the presence of the melt transesterification catalyst. As the reaction proceeds, the diphenyl carbonate may be consumed while the phenolic byproduct is generated.

In an aspect, the melt polymerization reaction mixture may comprise a melt transesterification catalyst. Melt transesterification catalysts are well-known in the art and are not limited to the examples disclosed herein. Exemplary melt transesterification catalysts are disclosed in U.S. Pat. Nos. 7,365,149, 7,547,799, 7,619,053, and 7,671,165.

In some aspects, the melt transesterification catalyst may include at least one alpha and/or beta transesterification catalyst. The alpha catalyst, or the first catalyst, may typically be more thermally stable and less volatile than the beta, or second, catalyst. As such, an alpha catalyst may be more useful to the melt polymerization reaction if used in later high-temperature polymerization stages. In various aspects, the alpha catalyst may comprise metal or ions (cations or anions). In further examples, the alpha catalyst may comprise a metal cation and an anion. In a specific example, the cation may be an alkali or alkaline earth metal comprising Li, Na, K, Cs, Rb, Mg, Ca, Ba, Sr, or a combination comprising at least one of the foregoing. The anion may be a hydroxide (OH$^-$), superoxide (O$^{2-}$), thiolate (HS$^-$), sulfide (S$^{2-}$), a C$_{1-20}$ alkoxide, a C$_{6-20}$ aryloxide, a C$_{1-20}$ carboxylate, a phosphate including biphosphate, a C$_{1-20}$ phosphonate, a sulfate including bisulfate, sulfites including bisulfites and metabisulfites, a C$_{1-20}$ sulfonate, a carbonate including bicarbonate, or a combination comprising at least one of the foregoing. In another aspect, salts of an organic acid comprising both alkaline earth metal ions and alkali metal ions may also be used. Salts of organic acids useful as catalysts are illustrated by alkali metal and alkaline earth metal salts of formic acid, acetic acid, stearic acid and ethyelenediaminetetraacetic acid. The catalyst may also comprise the salt of a non-volatile inorganic acid. By "nonvolatile", it is meant that the referenced compounds have no appreciable vapor pressure at ambient temperature and pressure. In particular, these compounds are not volatile at temperatures at which melt polymerizations of polycarbonate are typically conducted. The salts of nonvolatile acids are alkali metal salts of phosphites; alkaline earth metal salts of phosphites; alkali metal salts of phosphates; and alkaline earth metal salts of phosphates.

Exemplary alpha transesterification catalysts include, lithium hydroxide, sodium hydroxide, potassium hydroxide, cesium hydroxide, magnesium hydroxide, calcium hydroxide, barium hydroxide, lithium formate, sodium formate, potassium formate, cesium formate, lithium acetate, sodium acetate, potassium acetate, lithium carbonate, sodium carbonate, potassium carbonate, lithium methoxide, sodium methoxide, potassium methoxide, lithium ethoxide, sodium ethoxide, potassium ethoxide, lithium phenoxide, sodium phenoxide, potassium phenoxide, sodium sulfate, potassium sulfate, NaH$_2$PO$_3$, NaH$_2$PO$_4$, Na$_2$H$_2$PO$_3$, KH$_2$PO$_4$, CsH$_2$PO$_4$, Cs$_2$H$_2$PO$_4$, Na$_2$SO$_3$, Na$_2$S$_2$O$_5$, sodium mesylate, potassium mesylate, sodium tosylate, potassium tosylate, magnesium disodium ethylenediamine tetraacetate (EDTA magnesium disodium salt), or a combination comprising at least one of the foregoing. It will be understood that the foregoing list is exemplary and should not be considered as limited thereto.

In one aspect, the alpha transesterification catalyst is an alpha catalyst comprising an alkali or alkaline earth salt. In an exemplary aspect, the transesterification catalyst may comprise sodium hydroxide, potassium hydroxide, sodium carbonate, potassium carbonate, sodium methoxide, potassium methoxide, NaH$_2$PO$_4$, or a combination comprising at least one of the foregoing.

The amount of alpha catalyst may vary widely according to the conditions of the melt polymerization, and may be about 0.001 micromole (μmol) to about 500 μmol. In further aspects, the amount of beta calulst used may be based upon the total number of moles of dihydroxy compound used in the melt polymerization reaction.

In another aspect, the beta catalyst, i.e., a second transesterification catalyst, may optionally be included in the melt polymerization process, provided that the inclusion of such a second transesterification catalyst does not significantly adversely affect the desirable properties of the polycarbonate. A beta catalyst may include a quaternary ammonium compound, a quaternary phosphonium compound, or a combination comprising at least one of the foregoing. Exemplary transesterification catalysts may further include a combination of a phase transfer catalyst of formula (R$^3$)$_4$Q$^+$X above, wherein each R$^3$ is the same or different, and is a C$_{1-10}$ alkyl group; Q is a nitrogen or phosphorus atom; and X is a halogen atom or a C$_{1-8}$ alkoxy group or C$_{6-18}$ aryloxy group. Exemplary phase transfer catalyst salts include, for example, [CH$_3$(CH$_2$)$_3$]$_4$NX, [CH$_3$(CH$_2$)$_3$]$_4$PX, [CH$_3$(CH$_2$)$_5$]$_4$NX, [CH$_3$(CH$_2$)$_6$]$_4$NX, [CH$_3$(CH$_2$)$_4$]$_4$NX, CH$_3$[CH$_3$(CH$_2$)$_3$]$_3$NX, and CH$_3$[CH$_3$(CH$_2$)$_2$]$_3$NX, wherein X is Cl$^-$, Br$^-$, a C$_{1-8}$ alkoxy group or a C$_{6-18}$ aryloxy group.

Examples of such beta transesterification catalysts include tetrabutylammonium hydroxide, methyltributylammonium hydroxide, tetrabutylammonium acetate, tetrabutylphosphonium hydroxide, tetrabutylphosphonium acetate, tetrabutylphosphonium phenolate, or a combination comprising at least one of the foregoing. Other melt transesterification catalysts include alkaline earth metal salts or alkali metal salts. In various aspects, where a beta catalyst is desired, the beta catalyst may be present in a molar ratio, relative to the alpha catalyst, of less than or equal to 10, specifically less than or equal to 5, more specifically less than or equal to 1, and still more specifically less than or equal to 0.5. In other aspects, the melt polymerization reaction disclosed herein uses only an alpha catalyst as described hereinabove, and is substantially free of any beta catalyst. As defined herein, "substantially free of" may mean where the beta catalyst has been excluded from the melt polymerization reaction. In one aspect, the beta catalyst is present in an amount of less than about 10 ppm, specifically less than 1 ppm, more specifically less than about 0.1 ppm, more specifically less than or equal to about 0.01 ppm, and more specifically less than or equal to about 0.001 ppm, based on the total weight of all components used in the melt polymerization reaction.

In various aspects, the melt polymerization process disclosed herein may comprise a dihydroxy compound. Dihydroxy compounds of the present disclosure may have the formula HO—R$^1$—OH, which includes dihydroxy compounds of formula (1):

$$HO\text{-}A^1\text{-}Y^1\text{-}A^2\text{-}OH \quad (1),$$

wherein Y$^1$, A$^1$ and A$^2$ are as described above. Also included are bisphenol compounds of general formula (2):

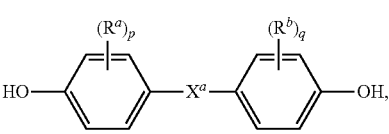

wherein R$^a$ and R$^b$ each represent a halogen atom or a monovalent hydrocarbon group and may be the same or different; p and q are each independently integers from 0 to 4; and X$^a$ represents one of the groups of formula (3):

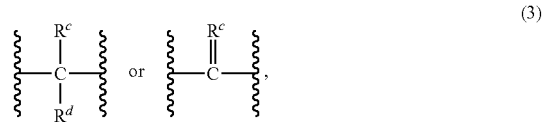

wherein R$^c$ and R$^d$ each independently represent a hydrogen atom or a monovalent linear or cyclic hydrocarbon group and R$^e$ is a divalent hydrocarbon group.

In various aspects, examples of suitable dihydroxy compounds include the dihydroxy-substituted hydrocarbons disclosed by name or formula (generic or specific) in U.S. Pat. No. 4,217,438. A nonexclusive list of specific examples of suitable dihydroxy compounds includes the following: resorcinol, 4-bromoresorcinol, hydroquinone, 4,4'-dihydroxybiphenyl, 1,6-dihydroxynaphthalene, 2,6-dihydroxynaphthalene, bis(4-hydroxyphenyl)methane, bis(4-hydroxyphenyl)diphenylmethane, bis(4-hydroxyphenyl)-1-naphthylmethane, 1,2-bis(4-hydroxyphenyl)ethane, 1,1-bis(4-hydroxyphenyl)-1-phenylethane, 2-(4-hydroxyphenyl)-2-(3-hydroxyphenyl)propane, bis(4-hydroxyphenyl)phenylmethane, 2,2-bis(4-hydroxy-3-bromophenyl)propane, 1,1-bis(hydroxyphenyl)cyclopentane, 1,1-bis(4-hydroxyphenyl)cyclohexane, 1,1-bis(4-hydroxyphenyl)isobutene, 1,1-bis(4-hydroxyphenyl)cyclododecane, trans-2,3-bis(4-hydroxyphenyl)-2-butene, 2,2-bis(4-hydroxyphenyl)adamantine, (alpha, alpha'-bis(4-hydroxyphenyl)toluene, bis(4-hydroxyphenyl)acetonitrile, 2,2-bis(3-methyl-4-hydroxyphenyl)propane, 2,2-bis(3-ethyl-4-hydroxyphenyl)propane, 2,2-bis(3-n-propyl-4-hydroxyphenyl)propane, 2,2-bis(3-isopropyl-4-hydroxyphenyl)propane, 2,2-bis(3-sec-butyl-4-hydroxyphenyl)propane, 2,2-bis(3-t-butyl-4-hydroxyphenyl)propane, 2,2-bis(3-cyclohexyl-4-hydroxyphenyl)propane, 2,2-bis(3-allyl-4-hydroxyphenyl)propane, 2,2-bis(3-methoxy-4-hydroxyphenyl)propane, 2,2-bis(4-hydroxyphenyl)hexafluoropropane, 1,1-dichloro-2,2-bis(4-hydroxyphenyl)ethylene, 1,1-dibromo-2,2-bis(4-hydroxyphenyl)ethylene, 1,1-dichloro-2,2-bis(5-phenoxy-4-hydroxyphenyl)ethylene, 4,4'-dihydroxybenzophenone, 3,3-bis(4-hydroxyphenyl)-2-butanone, 1,6-bis(4-hydroxyphenyl)-1,6-hexanedione, ethylene glycol bis (4-hydroxyphenyl)ether, bis(4-hydroxyphenyl)ether, bis(4-hydroxyphenyl)sulfide, bis(4-hydroxyphenyl)sulfoxide, bis (4-hydroxyphenyl)sulfone, 9,9-bis(4-hydroxyphenyl) fluorine, 2,7-dihydroxypyrene, 6,6'-dihydroxy-3,3,3',3'-tetramethylspiro(bis)indane ("spirobiindane bisphenol"), 3,3-bis(4-hydroxyphenyl)phthalide, 2,6-dihydroxydibenzo-p-dioxin, 2,6-dihydroxythianthrene, 2,7-dihydroxyphenoxathin, 2,7-dihydroxy-9,10-dimethylphenazine, 3,6-dihydroxydibenzofuran, 3,6-dihydroxydibenzothiophene, 2,7-dihydroxycarbazole, 3,3-bis(4-hydroxyphenyl) phthalimidine, 2-phenyl-3,3-bis-(4-hydroxyphenyl) phthalimidine (PPPBP), and the like, as well as mixtures including at least one of the foregoing dihydroxy compounds.

In a further aspect, examples of the types of bisphenol compounds that may be represented by formula (3) includes 1,1-bis(4-hydroxyphenyl)methane, 1,1-bis(4-hydroxyphenyl)ethane, 2,2-bis(4-hydroxyphenyl)propane (hereinafter "bisphenol A" or "BPA"), 2,2-bis(4-hydroxyphenyl)butane, 2,2-bis(4-hydroxyphenyl)octane, 1,1-bis(4-hydroxyphenyl) propane, 1,1-bis(4-hydroxyphenyl) n-butane, 2,2-bis(4-hydroxy-1-methylphenyl)propane, and 1,1-bis(4-hydroxy-t-butylphenyl)propane. Combinations including at least one of the foregoing dihydroxy compounds may also be used. In various further aspects, bisphenols containing substituted or unsubstituted cyclohexane units may be used, for example bisphenols of formula (4):

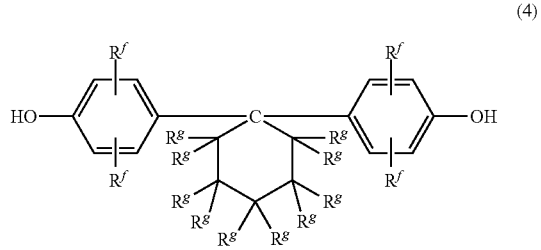

(4)

wherein each $R^f$ is independently hydrogen, $C_{1-12}$ alkyl, or halogen; and each $R^g$ is independently hydrogen or $C_{1-12}$ alkyl. The substituents may be aliphatic or aromatic, straight chain, cyclic, bicyclic, branched, saturated, or unsaturated. Such cyclohexane-containing bisphenols, for example the reaction product of two moles of a phenol with one mole of a hydrogenated isophorone, are useful for making polycarbonate polymers with high glass transition temperatures and high heat distortion temperatures. Cyclohexyl bisphenol containing polycarbonates, or a combination comprising at least one of the foregoing with other bisphenol polycarbonates, are supplied by Bayer Co. under the APEC® trade name.

In further aspects, additional useful dihydroxy compounds are those compounds having the formula HO—$R^1$—OH include aromatic dihydroxy compounds of formula (4):

(5)

wherein each $R^h$ is independently a halogen atom, a $C_{1-10}$ hydrocarbyl such as a $C_{1-10}$ alkyl group, a halogen substituted $C_{1-10}$ hydrocarbyl such as a halogen-substituted $C_{1-10}$ alkyl group, and n is 0 to 4. The halogen is usually bromine.

In a further aspect, the branching agents include polyfunctional organic compounds containing at least three functional groups selected from hydroxyl, carboxyl, carboxylic anhydride, haloformyl, and mixtures thereof. Specific examples include trimellitic acid, trimellitic anhydride, trimellitic trichloride, tris-p-hydroxy phenyl ethane, isatin-bis-phenol, tris-phenol TC (1,3,5-tris((p-hydroxyphenyl)isopropyl)benzene), tris-phenol PA (4(4(1,1-bis(p-hydroxyphenyl)-ethyl)alpha, alpha-dimethyl benzyl) phenol), 4-chloroformyl phthalic anhydride, trimesic acid, and benzophenone tetracarboxylic acid. The branching agents may be added at a level of from 0.05-2.0 weight percent. Branching agents and procedures for making branched polycarbonates are described in U.S. Pat. Nos. 3,635,895 and 4,001,184. All types of polycarbonate end groups are contemplated as being useful in the thermoplastic composition.

In an aspect, the melt polymerization process disclosed herein may include a carbonate source. As an example, a diaryl carbonate may be used as the carbonate source in melt polymerization processes. Exemplary diaryl carbonates that may be used according to the present disclosure are disclosed in U.S. Pat. Nos. 7,365,149, 7547,799, 7,619,053, and 7,671,165. Of the diaryl carbonates disclosed in the patents, non-ester-substituted diaryl carbonates that may be used may include for example diphenyl carbonate, ditolylcarbonate, bis(chlorophenyl) carbonate, m-cresyl carbonate, and dinapthyl carbonate. Some specific and non-limiting examples of non-activated carbonates are bis(o-methylphenyl)carbonate, bis(p-cumylphenyl)carbonate, bis(p-(1,1,3,3-tetramethyl)butylphenyl)carbonate and bis(o-cyanophenyl) carbonate. Unsymmetrical combinations of these structures may also be used as non-activated carbonates.

A melt polymerization process may employ an activated carbonate. As used herein, the term "activated carbonate", is defined as a diarylcarbonate that is more reactive than diphenylcarbonate in transesterification reactions. Activated, or ester-substituted diaryl carbonates may increase transesterification reaction rates allowing the melt polymerization reaction to occur in few pieces of equipment, at reduced temperature, and/or in minimal residence times. Specific non-limiting examples of activated carbonates include bis(o-methoxycarbonylphenyl)carbonate, bis(o-chlorophenyl)carbonate, bis(o-nitrophenyl)carbonate, bis(o-acetylphenyl)carbonate, bis(o-phenylketonephenyl)carbonate, bis(o-formylphenyl)carbonate. Examples of specific ester-substituted diarylcarbonates include, but are not limited to, bis(methylsalicyl)carbonate (CAS Registry No. 82091-12-1) (also known as BMSC or bis(o-methoxycarbonylphenyl) carbonate), bis(ethylsalicyl)carbonate, bis(propylsalicyl)carbonate, bis(butylsalicyl)carbonate, bis(benzylsalicyl)carbonate, bis(methyl-4-chlorosalicyl)carbonate and the like. In one aspect, bis(methylsalicyl)carbonate is used as the activated carbonate in melt polycarbonate synthesis due to its lower molecular weight and higher vapor pressure. Some non-limiting examples of non-activating groups which, when present in an ortho position, would not be expected to result in activated carbonates are alkyl, cycloalkyl or cyano groups.

According to aspects of the present disclosure, the melt polycarbonate resin may be derived from a diarylcarbonate source. As a specific example, the melt polycarbonate resin may be derived from diphenyl carbonate.

In one aspect, an end-capping agent (also referred to as a chain-stopper) may optionally be used to limit molecular weight growth rate, and so control molecular weight in the polycarbonate. Exemplary chain-stoppers include certain monophenolic compounds (i.e., phenyl compounds having a single free hydroxy group), monocarboxylic acid chlorides, and/or monochloroformates. Phenolic chain-stoppers are exemplified by phenol and $C_1$-$C_{22}$ alkyl-substituted phenols such as p-cumyl-phenol, resorcinol monobenzoate, and p- and tertiary-butyl phenol, cresol, and monoethers of diphenols, such as p-methoxyphenol. Alkyl-substituted phenols with branched chain alkyl substituents having 8 to 9 carbon atoms may be specifically mentioned. Certain monophenolic UV absorbers may also be used as a capping agent, for example 4-substituted-2-hydroxybenzophenones and their derivatives, aryl salicylates, monoesters of diphenols such as resorcinol monobenzoate, 2-(2-hydroxyaryl)-benzotriazoles and their derivatives, 2-(2-hydroxyaryl)-1,3,5-triazines and their derivatives, and the like.

In another aspect, end groups may be derived from the carbonyl source (i.e., the diphenyl carbonate), from selection of monomer ratios, incomplete polymerization, chain scission, and the like, as well as any added end-capping groups, and may include derivatizable functional groups such as hydroxy groups, carboxylic acid groups, or the like. In one aspect, the endgroup of a polycarbonate, including a polycarbonate resin as defined herein, may comprise a structural unit derived from a diaryl carbonate, for example the diphenyl carbonate, where the structural unit may be an endgroup. In a further aspect, the endgroup is derived from an activated carbonate. Such endgroups may be derived from the transesterification reaction of the alkyl ester of an appropriately substituted activated carbonate, with a hydroxy group at the end of a polycarbonate polymer chain, under conditions in which the hydroxy group reacts with the ester carbonyl from the activated carbonate, instead of with the carbonate carbonyl of the activated carbonate. In this way, structural units derived from ester containing compounds or substructures derived from the activated carbonate and present in the melt polymerization reaction may form ester endgroups.

In various aspects of the present disclosure, the melt polymerization polycarbonate composition may have a Fries content of less than about 800 ppm. Polycarbonates prepared according to a melt polymerization process or activated carbonate melt process such as those presented in U.S. Pat. Nos. 5,151,491 and 5,142,018 typically contain a significant concentration of Fries product when compared to an interfacial polycarbonate polymerization product. Although, a low level of Fries product may be tolerated in the melt process polycarbonate product, the presence of higher levels of Fries product may negatively impact performance characteristics of the polycarbonate, such as moldability and impact strength. With appropriate adjustments, the melt polymerization process may be performed to achieve a resultant polycarbonate composition with a particular Fries concentration.

The Fries product, or Fries rearrangement, arises as a side reaction occurring during the melt polymerization polycarbonate process. The term "Fries product" is defined as a structural unit of the product polycarbonate which upon hydrolysis of the product polycarbonate affords a carboxy-substituted dihydroxy aromatic compound bearing a carboxy group adjacent to one or both of the hydroxy groups of said carboxy-substituted dihydroxy aromatic compound. The resultant "Fries product" may serve as a site for branching of the polycarbonate chains thereby affecting flow and other properties of the polycarbonate. During preparation of the polycarbonate, the Fries rearrangement denotes the presence of a repeating unit in a polycarbonate having the following formula (7):

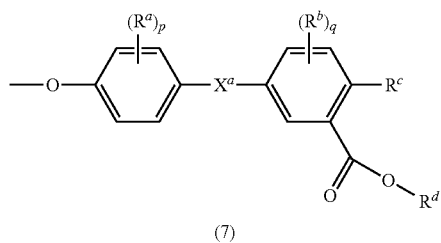

(7)

Wherein $R^a$, $R^b$, p, q, and $X^a$ are defined as above. $R^c$ may be a hydroxyl group or a carbonate or ether. A polymer chain may form via the carbonate or ether group. The $R^d$ may be hydrogen or a substituted aryl group. A polymer chain may form via the substituted aryl group. For example, the following rearrangements (linear Fries, branched/ether Fries, and acid Fries) may occur:

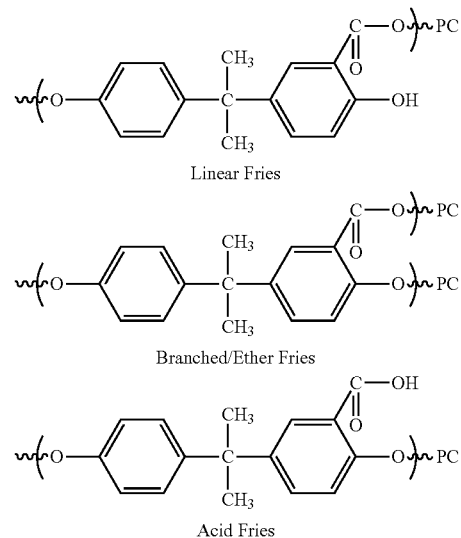

Linear Fries

Branched/Ether Fries

Acid Fries

The total amount of branched Fries rearrangement may be adjusted during melt polymerization by modifying the temperatures and/or reaction times. Moreover, melt polymerization reagents may also be changed. For example, alkali metal hydroxides, such as sodium hydroxide, are employed as catalysts in the preparation of polycarbonate using the melt process. Alkali metal hydroxides, although effective catalysts in terms of rates of conversion of starting materials to product polycarbonate, tend to produce relatively high levels of Fries rearrangement product. This may occur because by-products formed at high temperature include Fries rearrangement of carbonate units along the growing polymer chains.

In various aspects of the present disclosure the Fries rearrangement of carbonate units along the growing polymer chains may also be measured to ensure that the process adjustments provide the desired amount of Fries rearrangement. The content of the various Fries components in polycarbonates may be determined by nuclear magnetic resonance (NMR) analysis. NMR peaks corresponding to branched Fries structure, linear Fries structure, and acid Fries structure may be integrated to obtain the total Fries content. Quantification of Fries rearrangement content and the polycarbonate aryl hydroxy end-group content may be obtained based on the integral of the proton 1H NMR signal of the Fries components to the integral of the eight polycarbonate protons, as specifically described in the examples. In further aspects, the Fries content may be measured by KOH methanolysis of a resin and may be reported as parts per million (ppm).

In various aspects of the present disclosure, the melt polymerization process may be performed in a series of reactors within which operating conditions such as temperature and pressure may be controlled. Typically a melt polymerization reactor system comprises an oligomer forming section and polymer molecular weight building section. The types of equipment used in each these sections are not particularly limited and may include for example mixing devices, stirred or unstirred vessels or reactors, kneaders, extruders, compounders, heat exchangers, flash tanks, transfer pipes, and the like. Examples of melt polymerization reaction systems and operating conditions are also disclosed in U.S. Pat. Nos. 7,365,149, 7,547,799, 7,619,053, and 7,671,165, discussed and incorporated by reference above.

According to the methods disclosed herein, one skilled in the art may be able to readily select acceptable operating conditions and specific reaction equipment for the reactor systems and methods herein described. For example standard operating temperatures of reactor equipment in a melt production facility may be 50° C. to 500° C. The higher the temperature, the faster the polymerization reaction. However, one skilled in the art will understand that as temperature increases undesired reaction byproducts may be formed and incorporated within the product polycarbonate and reaction components may be degraded. In some embodiments the melt polymerization conditions sufficient to produce polycarbonate include temperatures of 100° C. to 400° C. (e.g. 125° C. to 350° C., for example 150° C. to 325° C.).

In one aspect, control over the reactor system may allow for the removal of the phenolic byproduct from the reaction system. As the phenolic byproduct is removed, the melt transesterification reaction may be driven by equilibrium displacement. As the phenolic byproduct is removed the reaction may be driven toward building the molecular weight of the polycarbonate. The structure of the phenolic byproduct would depend upon the diaryl carbonate used as the carbonate source.

In a further aspect, volatile monohydric phenol may be removed from the molten reactants by distillation and the polymer is isolated as a molten residue. In another aspect, a useful melt process for making polycarbonates utilizes a diaryl carbonate ester having electron-withdrawing substituents on the aryls. Examples of specifically useful diaryl carbonate esters with electron withdrawing substituents include bis(4-nitrophenyl)carbonate, bis(2-chlorophenyl) carbonate, bis(4-chlorophenyl)carbonate, bis(methyl salicyl)carbonate, bis(4-methylcarboxylphenyl)carbonate, bis (2-acetylphenyl)carboxylate, bis(4-acetylphenyl) carboxylate, or a combination comprising at least one of the foregoing.

In one aspect, the reactants for the polymerization reaction using a diphenyl carbonate may be charged into a reactor either in the solid form or in the molten form. Initial charging of reactants into a reactor and subsequent mixing of these materials under reactive conditions for polymerization may be conducted in an inert gas atmosphere such as a nitrogen atmosphere. The charging of one or more reactants may also be done at a later stage of the polymerization reaction. Mixing of the reaction mixture may be accomplished by any methods known in the art, such as by stirring. Reactive conditions include time, temperature, pressure and other factors that affect polymerization of the reactants. Typically the activated aromatic carbonate such as diphenyl carbonate may be added at a mole ratio of 0.8 to 1.3, and more preferably 0.9 to 1.3, and all subranges there between, relative to the total moles of monomer unit compounds (i.e., aromatic dihydroxy compound, and aliphatic diacid or diol). In a specific aspect, the molar ratio of diphenyl carbonate to monomer unit compounds is 1.013 to 1.29, specifically 1.015 to 1.028.

In one aspect, the melt polymerization reaction may be conducted by subjecting the reaction mixture to a series of temperature-pressure-time protocols. In some aspects, this involves gradually raising the reaction temperature in stages while gradually lowering the pressure in stages. In a further aspect, the pressure may be reduced from about atmospheric pressure at the start of the reaction to about 1 millibar (100 Pa) or lower, or in another aspect to 0.1 millibar (10 Pa) or lower in several steps as the reaction approaches completion. The temperature may be varied in a stepwise fashion beginning at a temperature of about the melting temperature of the reaction mixture and subsequently increased to final temperature. In one aspect, the reaction mixture is heated from room temperature to about 150° C. In such an aspect, the polymerization reaction starts at a temperature of about 150° C. to about 220° C. In another aspect, the polymerization temperature may be up to about 220° C. In other aspects, the polymerization reaction may then be increased to about 250° C. and then optionally further increased to a temperature of about 320° C., and all subranges there between. In one aspect, the total reaction time may be from about 30 minutes to about 200 minutes and all subranges there between. This procedure will generally ensure that the reactants react to give polycarbonates with the desired molecular weight, glass transition temperature and physical properties. The reaction proceeds to build the polycarbonate chain with production of ester-substituted alcohol by-product such as methyl salicylate. In one aspect, efficient removal of the by-product may be achieved by different techniques such as reducing the pressure. Generally the pressure starts relatively high in the beginning of the reaction and is lowered progressively throughout the reaction and temperature is raised throughout the reaction.

In one aspect, the progress of the reaction may be monitored by measuring the melt viscosity or the weight average molecular weight of the reaction mixture using techniques known in the art such as gel permeation chromatography. These properties may be measured by taking discrete samples or may be measured on-line. After the desired melt viscosity and/or molecular weight is reached, the final polycarbonate product may be isolated from the reactor in a solid or molten form. It will be appreciated by a person skilled in the art, that the method of making polycarbonate as described in the preceding sections may be made in a batch or a continuous process and the process disclosed herein is preferably carried out in a solvent free mode which characterizes a melt polymerization process. Reactors chosen should ideally be self-cleaning and should minimize any "hot spots." However, vented extruders similar to those that are commercially available may be used.

In addition to the foregoing components, the polycarbonate compositions from which the disclosed articles are formed may comprise a balance amount of one or more additive materials ordinarily incorporated in polycarbonate resin compositions of this type, with the proviso that the additives are selected so as to not significantly adversely affect the desired properties of the polycarbonate composition. The melt polycarbonate resin may comprise one or more suitable additives with the proviso that the additives are selected so as to not significantly adversely affect the desired properties such as transparency, impact strength, heat stability, and/or weathering resistance of the melt polycarbonate. The reaction mixture may optionally be blended with any conventional additives used in thermoplastics applications, such as preparing molded articles. These additives include, without limitation, UV stabilizers/absorbers, antioxidants, heat stabilizers, mold release agents, coloring agents, antistatic agents, slip agents, antiblocking agents, lubricants, anticlouding agents, coloring agents, natural oils, synthetic oils, waxes, organic fillers, inorganic fillers, branching agents and mixtures thereof. Combinations of additives can be used. Such additives may be mixed at a suitable time during the mixing of the components for forming the composition. The disclosed articles herein formed from polycarbonate prepared according to a melt polymerization process may include glycerol tristearate (GTS) as an additive. In one aspect, the additive such as glycerol tristearate, may be prepared as a masterbatch with the melt resin polycarbonate composition via extrusion. In another aspect, the GTS may be added in a molten state directly into the extruder for addition to the melt polycarbonate.

In one aspect, a blend of the melt polycarbonate resin composition and additives may be formed which aids in processing the blend to form the desired molded article, such as an optical article (disk or lens), automobile lamp components or the like. The blend may optionally contain about 0.0001 to about 10 percent by weight of the desired additives. In an aspect, the blend contains about 0.0001 to about 1.0% by weight of the desired additives.

The composition may further include an anti-static additive. An exemplary anti-static additive may comprise a halogenated carbon sulfonic acid salt of a polysubstituted phosphonium compound. In one aspect, the composition may include tetrabutyl phosphonium per fluoro-butylsulfonate.

Exemplary ultraviolet (UV) absorbers or UV protection agents may include, but are not limited to, salicylic acid UV absorbers, benzophenone UV absorbers, benzotriazole UV absorbers, cyanoacrylate UV absorbers and mixtures thereof. An exemplary UV protection agent/absorber may include 2-(2 hydroxy-5-t-octylphenyl) benzotriazole or phenol, 2,2'-methylene-bis(6-(2H-benzotriazol-2-yl)-4-(1,1,3, 3-tetramethylbutyl)). Examples of heat-resistant stabilizers, include, but are not limited to, phenol stabilizers, organic thioether stabilizers, organic phosphite stabilizers, hindered amine stabilizers, epoxy stabilizers and mixtures thereof. The heat-resistant stabilizer may be added in the form of a solid or liquid. Examples of the mold-release agents include, but are not limited to natural and synthetic paraffins, polyethylene waxes, fluorocarbons, and other hydrocarbon mold-release agents; stearic acid, hydroxystearic acid, and other higher fatty acids, hydroxyfatty acids, and other fatty acid mold-release agents; stearic acid amide, ethylenebisstearamide, and other fatty acid amides, alkylene bisfatty acid amides, and other fatty acid amide mold-release agents; stearyl alcohol, cetyl alcohol, and other aliphatic alcohols, polyhydric alcohols, polyglycols, polyglycerols and other alcoholic mold release agents; butyl stearate, pentaerythritol tetrastearate, and other lower alcohol esters of fatty acids, polyhydric alcohol esters of fatty acids, polyglycol esters of fatty acids, and other fatty acid ester mold release agents; silicone oil and other silicone mold release agents, and mixtures of any of the aforementioned. The coloring agent may be either pigments or dyes. Inorganic coloring agents and organic coloring agents may be used separately or in combination. Examples of branching agents include, without limitation, THPE, 9-carboxyoctadecandioic acid, or 1,3, 5-trihydroxybenzene. Additives such as plasticizers, lubricants, and/or mold release agents additive are generally used in amounts of about 0.01 weight percent (wt. %) to about 20 wt. %, optionally about 0.5 wt. % to about 10 wt. % the polycarbonate blend composition. In one aspect, the mold release agent is glycerol tristearate In a further aspect, the disclosed blended thermoplastic compositions may further comprise a primary antioxidant or "stabilizer" (e.g., a hindered phenol) and, optionally, a secondary antioxidant (e.g., a phosphate and/or thioester). In one aspect, the antioxidant is a primary antioxidant, a secondary antioxidant, or combinations thereof. In a still further aspect, the primary antioxidant is selected from a hindered phenol and secondary aryl amine, or a combination thereof. An exemplary antioxidant may include octadecyl 3-(3,5-di-tert-butyl-4-hydroxyphenyl)propionate as a sterically hindered phenolic antioxidant. Antioxidants may generally be used in amounts of about 0.01 wt. % to about 3 wt. %, optionally about 0.05 wt. % to about 2.0 wt. % of the blended thermoplastic composition. In some aspects, hydrolytic and thermal stabilizers may be used with the melt polycarbonate resin. Thermal stabilizers are generally used in amounts of about 0.01 wt. % to about 5 wt. %, optionally about 0.05 wt. % to about 2.0 wt. % of the polycarbonate blend composition.

In a further aspect, anti-drip agents may also be present. In a further aspect, the anti-drip agent is a styrene-acrylonitrile copolymer encapsulated polytetrafluoroethylene. Exemplary anti-drip agents may include a fibril forming or non-fibril forming fluoropolymer such as polytetrafluoroethylene (PTFE) or PTFE encapsulated in SAN known as TSAN. The anti-drip agent may be present in an amount from about 0.01 wt. % to about 3 wt. %.

Articles of Manufacture

In an aspect, the present disclosure relates to articles comprising the melt polycarbonate resin composition exhibiting properties disclosed herein. A melt polycarbonate resin composition having a melt volume rate of between about 18 $cm^3$/10 min. and about 22 $cm^3$/10 min., a fries concentration below about 800 ppm, and including a glycerol tristearate additive may be used to form an article exhibiting an Izod impact performance between about 9.5 KJ/$m^2$ and about 13 KJ/$m^2$ based on ISO 180 at 4 mm thickness at room temperature. The melt polycarbonate resin compositions disclosed herein may exhibit comparable advanced weathering performance when evaluated in accordance with ISO 4892-Daylight. In yet further aspects, the melt polycarbonate resin composition disclosed herein and prepared with glycerol tristearate may exhibit improved flow properties.

The melt polycarbonate resin as disclosed herein may be useful as an alternative to polycarbonate resins prepared according to an interfacial polymerization process. In yet further aspects, the properties of the melt polycarbonate resin as disclosed herein may be particularly useful in applications where articles formed therefrom are subjected to prolonged weathering, wear, or use. Accordingly, the melt polycarbonate resin may be used to form articles typically formed from interfacial polymerization polycarbonate resins. The transparency, flow, and impact performance of the articles may be comparable to the qualities achieved according to interfacial polymerization process.

As such, the disclosed melt polycarbonate resin may be used to manufacture articles for use in electronic, automotive, imaging, or optical devices. Devices and applications may include: anti-fog windows; lenses and/or transparent covers for lighting applications such as automotive lighting, street lighting, outdoor lighting, and high efficiency lighting such as light emitting diode LED applications, organic LED applications, fluorescent lighting applications, vapor gas discharge lighting application, and neon light application, which may produce less heat as a byproduct, compared to conventional light sources; optical lenses including camera and viewing lenses, e.g., for mobile telephone cameras, and for digital still photography cameras, mirrors, telescopic lenses, binoculars, automotive camera lenses, and ophthalmic items such as eyewear including sunglasses, protective goggles, face shields, and prescription lenses. Electro-optical devices may also include cathode ray tubes, fluorescent lighting, vapor gas discharge light sources, and neon light, as well as light emitting diodes, organic light emitting diodes, plasma, and liquid crystal screens.

Articles formed from the compositions and methods of the present disclosure may be particularly useful for the following applications: mobile phones, mobile computing devices, cameras, video recorders, projectors, corrective lenses, diffusers, or copiers. In yet further examples, the polycarbonate resins may be useful to form articles for use in devices such as lenses for use in portable electronics applications including cell phones, cameras, personal digital assistants, DVD players and recording devices, and the like. Furthermore, articles and products made from the disclosed compositions may be also be used in a variety of applications including thin-wall articles, where transparency, precision as defined by a high degree of reproducibility, retention of mechanical properties including impact strength, and precise optical properties are required. In a yet further example, the optically transparent, melt polycarbonate articles may be weatherable, or resistant to outdoor weathering conditions of higher heat and full sun conditions. The articles may be used to protect optoelectronic devices, such as solar cells, situated in outdoor working environments for extended periods of time while maintaining impact strength.

In one aspect, the present disclosure pertains to shaped, formed, or molded articles comprising polycarbonate compositions prepared according to the melt polymerization process disclosed herein. The polycarbonate compositions may be molded into useful shaped articles by a variety of means such as injection molding, extrusion, rotational molding, blow molding and thermoforming to form articles. The melt polycarbonate compositions described herein may also be made into film and sheet as well as components of laminate systems. The articles comprising the disclosed polycarbonate compositions may be, but are not limited to, computer and business machine housings such as housings for high end laptop personal computers, monitors, hand held electronic device housings such as housings for smart phones, tablets, music devices electrical connectors, and components of lighting fixtures, ornaments, home appliances, and the like.

In a further aspect, the molded articles may be used to manufacture devices in the automotive field. In a still further aspect, non-limiting examples of such devices in the automotive field which may use the disclosed blended thermoplastic compositions in the vehicle's interior include adaptive cruise control, headlight sensors, windshield wiper sensors, and door/window switches Various combinations of elements of this disclosure are encompassed by this disclosure, e.g. combinations of elements from dependent claims that depend upon the same independent claim.

Methods of Manufacture

In various aspects of the present disclosure, the melt polymerization reaction may be carried out in typical polymerization equipment, such as one or more continuously stirred reactors (CSTRs), plug flow reactors, wire wetting fall polymerizers, free fall polymerizers, wiped film polymerizers, BANBURY® mixers, single or twin screw extruders, or combinations of the foregoing. In one aspect, volatile monohydric phenol generated in situ may be removed from the molten reactants by distillation and the polymer is isolated as a molten residue.

The melt polycarbonate resin compositions of the present disclosure may be blended with the aforementioned ingredients by a variety of methods involving intimate admixing of the materials with any additional additives desired in the formulation. Because of the availability of melt blending equipment in commercial polymer processing facilities, melt processing methods are generally preferred. Illustrative examples of equipment used in such melt processing methods include: co-rotating and counter-rotating extruders, single screw extruders, co-kneaders, disc-pack processors and various other types of extrusion equipment. The temperature of the melt in the present process is preferably minimized in order to avoid excessive degradation of the resins. It is often desirable to maintain the melt temperature between about 230° C. and about 350° C. in the molten resin composition, although higher temperatures can be used provided that the residence time of the resin in the processing equipment is kept short. In some embodiments the melt processed composition exits processing equipment such as an extruder through small exit holes in a die. The resulting strands of molten resin are cooled by passing the strands through a water bath. The cooled strands may be chopped into small pellets for packaging and further handling.

Compositions may be manufactured by various methods, including batch or continuous techniques that employ kneaders, extruders, mixers, and the like. For example, the composition may be formed as a melt blend employing a twin-screw extruder. In some embodiments at least some of the components are added sequentially. Alternatively, the sequential addition of the components may be accomplished through multiple extrusions. A composition may be made by preextrusion of selected components. A second extrusion may then be employed to combine the preextruded components with the remaining components.

As described herein, the present disclosure relates to a method of making a polycarbonate composition from a melt polycarbonate polymerization process. The composition of the present disclosure may be formed using any known method of combining multiple components to form a polymer resin. In one aspect, the components are first blended in a high-speed mixer. Other low shear processes including but not limited to hand mixing may also accomplish this blending. The blend is then fed into the throat of a twin-screw extruder via a hopper. Alternatively, one or more of the components may be incorporated into the composition by feeding directly into the extruder at the throat and/or downstream through a sidestuffer. The extruder is generally operated at a temperature higher than that necessary to cause the composition to flow. The extrudate is immediately quenched in a water batch and pelletized. The pellets so prepared when cutting the extrudate may be one-fourth inch long or less as desired. Such pellets may be used for subsequent molding, shaping, or forming. In one aspect, the blend composition is formed by extrusion blending.

Moreover, it is to be understood that unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; and the number or type of aspects described in the specification.

Definitions

It is to be understood that the terminology used herein is for the purpose of describing particular aspects only and is not intended to be limiting. As used in the specification and in the claims, the term "comprising" may include the aspects "consisting of" and "consisting essentially of." Unless defined otherwise, all technical and scientific terms used herein have the same meaning as commonly understood by one of ordinary skill in the art to which this disclosure belongs. In this specification and in the claims which follow, reference will be made to a number of terms which shall be defined herein. All publications mentioned herein are incorporated herein by reference to disclose and describe the methods and/or materials in connection with which the publications are cited.

As used in the specification and the appended claims, the singular forms "a," "an" and "the" include plural referents unless the context clearly dictates otherwise. Thus, for example, reference to "a polycarbonate" includes mixtures of two or more such polycarbonates. Furthermore, for example, reference to a filler includes mixtures of two or more such fillers.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. It is also understood that each unit between two particular units are also disclosed. For example, if 10 and 15 are disclosed, then 11, 12, 13, and 14 are also disclosed.

As used herein, the terms "optional" or "optionally" mean that the subsequently described event, condition, component, or circumstance may or may not occur, and that the description includes instances where said event or circumstance occurs and instances where it does not.

As used herein, the term or phrase "effective," "effective amount," or "conditions effective to" refers to such amount or condition that is capable of performing the function or property for which an effective amount is expressed. As will be pointed out below, the exact amount or particular condition required will vary from one aspect to another, depending on recognized variables such as the materials employed and the processing conditions observed. Thus, it is not always possible to specify an exact "effective amount" or "condition effective to." However, it should be understood that an appropriate effective amount will be readily determined by one of ordinary skill in the art using only routine experimentation.

Disclosed are component materials to be used to prepare disclosed compositions of the disclosure as well as the compositions themselves to be used within methods disclosed herein. These and other materials are disclosed herein, and it is understood that when combinations, subsets, interactions, groups, etc. of these materials are disclosed that while specific reference of each various individual and collective combinations and permutation of these compounds cannot be explicitly disclosed, each is specifically contemplated and described herein. For example, if a particular compound is disclosed and discussed and a number of modifications that can be made to a number of molecules including the compounds are discussed, specifically contemplated is each and every combination and permutation of the compound and the modifications that are possible unless specifically indicated to the contrary. Thus, if a class of molecules A, B, and C are disclosed as well as a class of molecules D, E, and F and an example of a combination molecule, A-D is disclosed, then even if each is not individually recited each is individually and collectively contemplated meaning combinations, A-E, A-F, B-D, B-E, B-F, C-D, C-E, and C-F are considered disclosed. Likewise, any subset or combination of these is also disclosed. Thus, for example, the sub-group of A-E, B-F, and C-E would be considered disclosed. This concept applies to all aspects of this application including, but not limited to, steps in methods of making and using the compositions of the disclosure. Thus, if there are a variety of additional steps that can be performed it is understood that each of these additional steps can be performed with any specific aspect or combination of aspects of the methods of the disclosure.

References in the specification and concluding claims to parts by weight, of a particular element or component in a composition or article denotes the weight relationship between the element or component and any other elements or components in the composition or article for which a part by weight is expressed. Thus, in a composition containing 2 parts by weight of component X and 5 parts by weight component Y, X and Y are present at a weight ratio of 2:5, and are present in such ratio regardless of whether additional components are contained in the compound.

A weight percent of a component, unless specifically stated to the contrary, is based on the total weight of the formulation or composition in which the component is included. For example if a particular element or component in a composition or article is said to have 8% weight, it is understood that this percentage is relation to a total compositional percentage of 100%.

Compounds disclosed herein are described using standard nomenclature. For example, any position not substituted by any indicated group is understood to have its valence filled by a bond as indicated, or a hydrogen atom. A dash ("-") that is not between two letters or symbols is used to indicate a point of attachment for a substituent. For example, —CHO is attached through carbon of the carbonyl group. Unless defined otherwise, technical and scientific terms used herein have the same meaning as is commonly understood by one of skill in the art to which this disclosure belongs.

The term "alkyl group" as used herein is a branched or unbranched saturated hydrocarbon group of 1 to 24 carbon atoms, such as methyl, ethyl, n-propyl, isopropyl, n-butyl, isobutyl, t-butyl, pentyl, hexyl, heptyl, octyl, decyl, tetradecyl, hexadecyl, eicosyl, tetracosyl and the like. A "lower alkyl" group is an alkyl group containing from one to six carbon atoms.

The term "alkoxy" as used herein is an alkyl group bound through a single, terminal ether linkage; that is, an "alkoxy" group may be defined as —OR where R is alkyl as defined above. A "lower alkoxy" group is an alkoxy group containing from one to six carbon atoms.

The term "alkenyl group" as used herein is a hydrocarbon group of from 2 to 24 carbon atoms and structural formula containing at least one carbon-carbon double bond. Asymmetric structures such as (AB)C=C(CD) are intended to include both the E and Z isomers. This may be presumed in structural formulae herein wherein an asymmetric alkene is present, or it may be explicitly indicated by the bond symbol C.

The term "alkynyl group" as used herein is a hydrocarbon group of 2 to 24 carbon atoms and a structural formula containing at least one carbon-carbon triple bond.

The term "aryl group" as used herein is any carbon-based aromatic group including, but not limited to, benzene, naphthalene, etc. The term "aromatic" also includes "heteroaryl group," which is defined as an aromatic group that has at least one heteroatom incorporated within the ring of the aromatic group. Examples of heteroatoms include, but are not limited to, nitrogen, oxygen, sulfur, and phosphorus. The aryl group may be substituted or unsubstituted. The aryl group may be substituted with one or more groups including, but not limited to, alkyl, alkynyl, alkenyl, aryl, halide, nitro, amino, ester, ketone, aldehyde, hydroxy, carboxylic acid, or alkoxy.

The term "cycloalkyl group" as used herein is a non-aromatic carbon-based ring composed of at least three carbon atoms. Examples of cycloalkyl groups include, but are not limited to, cyclopropyl, cyclobutyl, cyclopentyl, cyclohexyl, etc. The term "heterocycloalkyl group" is a cycloalkyl group as defined above where at least one of the carbon atoms of the ring is substituted with a heteroatom such as, but not limited to, nitrogen, oxygen, sulfur, or phosphorus.

The term "aralkyl" as used herein is an aryl group having an alkyl, alkynyl, or alkenyl group as defined above attached to the aromatic group. An example of an aralkyl group is a benzyl group.

The term "hydroxyalkyl group" as used herein is an alkyl, alkenyl, alkynyl, aryl, aralkyl, cycloalkyl, halogenated alkyl, or heterocycloalkyl group described above that has at least one hydrogen atom substituted with a hydroxyl group.

The term "alkoxyalkyl group" is defined as an alkyl, alkenyl, alkynyl, aryl, aralkyl, cycloalkyl, halogenated alkyl, or heterocycloalkyl group described above that has at least one hydrogen atom substituted with an alkoxy group described above.

The term "ester" as used herein is represented by the formula —C(O)OA, where A may be an alkyl, halogenated alkyl, alkenyl, alkynyl, aryl, heteroaryl, cycloalkyl, cycloalkenyl, heterocycloalkyl, or heterocycloalkenyl group described above.

The term "carbonate group" as used herein is represented by the formula —OC(O)OR, where R may be hydrogen, an alkyl, alkenyl, alkynyl, aryl, aralkyl, cycloalkyl, halogenated alkyl, or heterocycloalkyl group described above.

The term "carboxylic acid" as used herein is represented by the formula —C(O)OH.

The term "aldehyde" as used herein is represented by the formula —C(O)H.

The term "keto group" as used herein is represented by the formula —C(O)R, where R is an alkyl, alkenyl, alkynyl, aryl, aralkyl, cycloalkyl, halogenated alkyl, or heterocycloalkyl group described above.

The term "carbonyl group" as used herein is represented by the formula C=O.

The term "ether" as used herein is represented by the formula AOA$^1$, where A and A$^1$ may be, independently, an alkyl, halogenated alkyl, alkenyl, alkynyl, aryl, heteroaryl, cycloalkyl, cycloalkenyl, heterocycloalkyl, or heterocycloalkenyl group described above.

As used herein, the term "Fries rearrangement" refers to a branched structural unit of the product polycarbonate ate bearing a aryl carbonyl group adjacent to a hydroxyl, a carbonate, or an ether unit on the same aryl ring. The term "Fries product" refers to polymers having Fries rearranged units. Likewise, the terms "Fries reaction" and "Fries rearrangement" are used interchangeably herein. Fries concentration or level or content, or variants thereof, refers to the amount of the Fries rearrangement product present in the composition.

As used herein, the term "melt polycarbonate" refers to a polycarbonate made by the transesterification of a diaryl carbonate with a dihydroxy aromatic compound.

The term "sulfo-oxo group" as used herein is represented by the formulas —S(O)$_2$R, —OS(O)$_2$R, or, —OS(O)$_2$OR, where R may be hydrogen, an alkyl, alkenyl, alkynyl, aryl, aralkyl, cycloalkyl, halogenated alkyl, or heterocycloalkyl group described above.

The term "comparable" as used herein may refer to similarity between given resin compositions described herein. Comparable may be used to express that properties, or the quantified values of given properties, are similar to or commensurate with the properties of another.

As used herein, the term "substantially identical reference composition" refers to a composition that is substantially identical to the inventive composition by consisting essentially of substantially the same proportions and components but in the absence of a single component.

The term "transparency" as used herein may refer to a level of transmittance for a resin composition that is greater than 50%, including exemplary transmittance values of at least 60%, 70%, 80%, 85%, 90%, and 95%, or any range of transmittance values derived from the above exemplified values. In some examples, the resin composition may exhibit a transmittance value of greater than 85%. Transmittance may be measured for a disclosed resin composition according to ASTM method D1003.

As used herein, the terms "number average molecular weight" or "Mn" can be used interchangeably, and refer to the statistical average molecular weight of all the polymer chains in the sample and is defined by the formula:

$$Mn = \frac{\sum N_i M_i}{\sum N_i},$$

where $M_i$ is the molecular weight of a chain and $N_i$ is the number of chains of that molecular weight. Mn can be determined for polymers, such as polycarbonate polymers or polycarbonate-PMMA copolymers, by methods well known to a person having ordinary skill in the art. It is to be understood that as used herein, Mn is measured gel permeation chromatography and as calibrated with polycarbonate standards. For example, gel permeation chromatography can be carried out using a crosslinked styrene-divinyl benzene column, at a sample concentration of 1 milligram per milliliter with appropriate mobile phase solvents.

As used herein, the terms "weight average molecular weight" or "Mw" can be used interchangeably, and are defined by the formula:

$$Mw = \frac{\sum N_i M_i^2}{\sum N_i M_i},$$

where $M_i$ is the molecular weight of a chain and $N_i$ is the number of chains of that molecular weight. Compared to Mn, Mw takes into account the molecular weight of a given chain in determining contributions to the molecular weight average. Thus, the greater the molecular weight of a given chain, the more the chain contributes to the Mw. It is to be understood that as used herein, Mw is measured gel permeation chromatography. In some cases, Mw is measured by gel permeation chromatography and calibrated with polycarbonate standards. In further aspects, Mw is measured by gel permeation chromatography and calibrated with polystyrene standards. Gel permeation chromatography can be carried out using a crosslinked styrene-divinyl benzene column, at a sample concentration of about 1 milligram per milliliter with appropriate mobile phase solvents.

As used herein, the terms "polydispersity index" or "PDI" can be used interchangeably, and are defined by the formula:

$$PDI = \frac{Mw}{Mn}.$$

The PDI has a value equal to or greater than 1, but as the polymer chains approach uniform chain length, the PDI approaches unity.

As used herein, the terms "mean" or "statistical mean", can be used interchangeably, and are defined by the formula:

$$\bar{x} = \frac{1}{n}\sum_{i=1}^{n} x_i$$

wherein $x_i$ is the measured value, and n is the number of values.

As used herein, the term "variance" refers to a numerical value that is used to indicate how widely the measured values in a group vary, and is defined by the formula:

$$\sigma^2 = \frac{\sum (x_i - \bar{x})^2}{n}$$

wherein $\sigma^2$ variance, $x_i$ is the measured value, $\bar{x}$ is the mean value, and n is the number of values.

The terms "BisA" or "bisphenol A," which can be used interchangeably, as used herein refers to a compound having a structure represented by the formula:

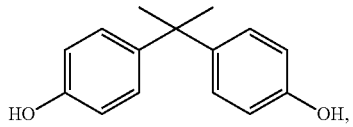

BisA can also be referred to by the name 4,4'-(propane-2,2-diyl)diphenol; p,p'-isopropylidenebisphenol; or 2,2-bis(4-hydroxyphenyl)propane. BisA has the CAS #80-05-7.

As used herein, "polycarbonate" refers to an oligomer or polymer comprising residues of one or more dihydroxy compounds, e.g. dihydroxy aromatic compounds, joined by carbonate linkages; it also encompasses homopolycarbonates, copolycarbonates, and (co)polyester carbonates. In one aspect, a polycarbonate can comprise any polycarbonate material or mixture of materials, for example, as recited in U.S. Pat. No. 7,786,246, which is hereby incorporated in its entirety for the specific purpose of disclosing various polycarbonate compositions and methods. The term polycarbonate can be further defined as compositions have repeating structural units of the formula (8):

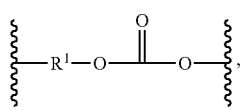

(8)

in which at least 60 percent of the total number of $R^1$ groups are aromatic organic radicals and the balance thereof are aliphatic, alicyclic, or aromatic radicals. In a further aspect, each $R^1$ is an aromatic organic radical and, more preferably, a radical of the formula (9):

$$-A^1-Y^1-A^2- \quad (9),$$

wherein each of $A^1$ and $A^2$ is a monocyclic divalent aryl radical and $Y^1$ is a bridging radical having one or two atoms that separate $A^1$ from $A^2$. In various aspects, one atom separates $A^1$ from $A^2$. For example, radicals of this type include, but are not limited to, radicals such as —O—, —S—, —S(O)—, —S(O$_2$)—, —C(O)—, methylene, cyclohexyl-methylene, 2-[2.2.1]-bicycloheptylidene, ethylidene, isopropylidene, neopentylidene, cyclohexylidene, cyclopentadecylidene, cyclododecylidene, and adamantylidene. The bridging radical $Y^1$ is preferably a hydrocarbon group or a saturated hydrocarbon group such as methylene, cyclohexylidene, or isopropylidene.

The terms "residues" and "structural units", used in reference to the constituents of the polymers, are synonymous throughout the specification. Each of the component materials disclosed herein are either commercially available and/or the methods for the production thereof are known to those of ordinary skill in the art.

In various aspects, the present disclosure pertains to and includes at least the following aspects.

Aspect 1. An article formed from a composition comprising: a melt polycarbonate resin derived from diphenyl carbonate; and glycerol tristearate mixed with the melt polycarbonate resin, wherein the composition exhibits a melt volume rate of between about 18 cm$^3$/10 minutes and about 22 cm$^3$/10 minutes, wherein the composition exhibits a fries concentration below about 800 ppm, wherein the article formed from the composition exhibits an Izod impact performance between about 9.5 KJ/m$^2$ and about 13 KJ/m$^2$ based on ISO 180 at 4 mm thickness at room temperature; and wherein the article formed from the composition exhibits weathering values of less than about 12 Delta Yellowness Index for an exposure time of 2000 hours when tested in accordance with ISO 4892.

Aspect 2. An article formed from a composition comprising: a melt polycarbonate resin derived from diphenyl carbonate; and glycerol tristearate mixed with the melt polycarbonate resin, wherein the composition exhibits a melt volume rate of between about 18 cm$^3$/10 minutes and about 22 cm$^3$/10 minutes, wherein the composition exhibits a fries concentration below about 800 ppm, wherein the article formed from the composition exhibits an Izod impact performance between about 9.5 KJ/m$^2$ and about 13 KJ/m$^2$ based on ISO 180 at 4 mm thickness; and wherein the article formed from the composition exhibits weathering values of less than about 12 Delta Yellowness Index for an exposure time of 2000 hours when tested in accordance with ISO 4892.

Aspect 3. The article of claim 1, wherein the article comprises an automotive lighting lens.

Aspect 4. The article of aspect 1, wherein the composition further comprises a UV protection additive.

Aspect 5. The article of aspect 4, wherein the UV protection additive comprises 2-(2 hydroxy-5-t-octylphenyl) benzotriazole.

Aspect 6. The article of aspect 1, wherein the composition further comprises tris(2,4-di tertbutylphenyl) phosphite.

Aspect 7. The article of aspect 1, wherein the composition further comprises octadecyl-3 -(3,5 -di-tert-butyl-4-hydroxyphenyl)propionate.

Aspect 8. The article of aspect 1, wherein the composition further comprises tetrabutyl phosphonium per fluoro-butylsulfonate.

Aspect 9. The article of aspect 1, wherein the composition further comprises a quenching agent.

Aspect 10. The article of aspect 9, wherein the quenching agent comprises n-butyl p-toluenesulfonate.

Aspect 11. The article of aspect 1, wherein the composition includes an end cap level of less than 81%.

Aspect 12. A method comprising: forming a polycarbonate resin by a melt transesterification process; mixing glycerol tristearate with the polycarbonate resin to form a composition; and forming an article from the composition, wherein the composition exhibits a melt volume rate of between about 18 cm$^3$/10 minutes and about 22 cm$^3$/10 minutes, wherein the composition exhibits a fries concentration below about 800 ppm, wherein the article formed from the composition exhibits an Izod impact performance between about 9.5 KJ/m$^2$ and about 13 KJ/m$^2$ based on ISO 180 at 4 mm thickness at room temperature; and wherein the article formed from the composition exhibits weathering values of less than about 12 Delta Yellowness Index for an exposure time of 2000 hours when tested in accordance with ISO 4892.

Aspect 13. The method of aspect 12, wherein the article comprises an automotive lighting lens.

Aspect 14. The method of aspect 12, further comprising mixing a UV protection additive with at least the polycarbonate resin to form the composition.

Aspect 15. The method of aspect 14, wherein the UV protection additive comprises 2-(2 hydroxy-5-t-octylphenyl) benzotriazole.

Aspect 16. The method of aspect 12, further comprising mixing tris(2,4-di tertbutylphenyl) phosphite with at least the polycarbonate resin to form the composition.

Aspect 17. The method of aspect 12, further comprising mixing octadecyl-3-(3,5-di-tert-butyl-4-hydroxyphenyl)propionate with at least the polycarbonate resin to form the composition.

Aspect 18. The method of aspect 12, further comprising mixing tetrabutyl phosphonium per fluoro-butylsulfonate with at least the polycarbonate resin to form the composition.

Aspect 19. The method of aspect 12, further comprising mixing a quenching agent with at least the polycarbonate resin to form the composition.

Aspect 20. The method of aspect 19, wherein the quenching agent comprises n-butyl p-toluenesulfonate.

Without further elaboration, it is believed that one skilled in the art can, using the description herein, utilize the present disclosure. The following examples are included to provide addition guidance to those skilled in the art of practicing the claimed disclosure. The examples provided are merely representative of the work and contribute to the teaching of the present disclosure. Accordingly, these examples are not intended to limit the disclosure in any manner.

While aspects of the present disclosure can be described and claimed in a particular statutory class, such as the system statutory class, this is for convenience only and one of skill in the art will understand that each aspect of the present disclosure can be described and claimed in any statutory class. Unless otherwise expressly stated, it is in no way intended that any method or aspect set forth herein be construed as requiring that its steps be performed in a specific order. Accordingly, where a method claim does not specifically state in the claims or descriptions that the steps are to be limited to a specific order, it is no way intended that an order be inferred, in any respect. This holds for any possible non-express basis for interpretation, including matters of logic with respect to arrangement of steps or operational flow, plain meaning derived from grammatical organization or punctuation, or the number or type of aspects described in the specification.

Throughout this application, various publications are referenced. The disclosures of these publications in their entireties are hereby incorporated by reference into this application in order to more fully describe the state of the art to which this pertains. The references disclosed are also individually and specifically incorporated by reference herein for the material contained in them that is discussed in the sentence in which the reference is relied upon. Nothing herein is to be construed as an admission that the present disclosure is not entitled to antedate such publication by virtue of prior disclosure. Further, the dates of publication provided herein can be different from the actual publication dates, which can require independent confirmation.

EXAMPLES

The following examples are put forth so as to provide those of ordinary skill in the art with a complete disclosure and description of how the methods, devices, and systems disclosed and claimed herein are made and evaluated, and are intended to be purely exemplary and are not intended to limit the disclosure. Efforts have been made to ensure accuracy with respect to numbers (e.g., amounts, temperature, etc.), but some errors and deviations should be accounted for. Unless indicated otherwise, parts are parts by weight, temperature is in degrees Celsius (° C.) or is at ambient temperature, and pressure is at or near atmospheric.

Notched Izod testing was performed according to ASTM 180 at 23° C., 10° C., 5° C., 0° C., −5° C., −10° C., and −20° C.

The additives presented in Table 1 were included in the polycarbonate compositions described in and evaluated herein.

TABLE 1

Additives for polycarbonates prepared according to the melt polymerization method.

| Component | Chemical description |
|---|---|
| PETS | Palmitic/Stearic Acid Ester of Dipenta/Pentaerythritol; CAS # 115-83-3 |
| GTS | Octadecanoic acid, 1,2,3-propanetriyl ester (glycerol tristearate) CAS # 55-43-1) |
| UV5411 | Ultraviolet agent 2-(2 hydroxy-5-t-octylphenyl) benzotriazole, CAS # 3147-75-9) |
| Tin360 | Ultraviolet agent Phenol, 2,2'-methylene-bis(6-(2H-benzotriazol-2-yl)-4-(1,1,3,3-tetramethylbutyl)) CAS # 103597-45-1) |
| AO1 | Irganox 1076 (Octadecyl-3-(3,5-di-tert-butyl-4-hydroxyphenyl)propionate, CAS # 2082-79-3, commercially available under the trade name KR-2710. |
| AO2 | Irgafos 168 (tris(2,4-di tertbutylphenyl) phosphite, CAS # 31570-04-4 |
| FC-1 | Tetrabutyl phosphonium per fluoro-butylsulfonate, CAS # 220689-12-3 |
| QU | n-butyl p-toluenesulfonate (CAS #778-28-9 |

For the non-limiting Examples described herein, samples were prepared comprising a different release agent.

As a comparative sample (CS1), a commercial grade polycarbonate prepared according an interfacial polymerization process was used. Comparative sample (CS1) is a polycarbonate prepared according to an interfacial polymerization process having a melt volume rate of from about 18 cm$^3$/10 minutes to about 22 cm$^3$/10 minutes at 300° C./1.2 kg when tested in accordance with ISO 1133 and having a flexural modulus of between about 2200 and 2400 MPa when tested in accordance with ISO 178. As an example, the CS1 may be LEXAN LS1 as provided by SABIC. In a further example, the CS1 may be Makrolon AL2447 available from Bayer®.

Melt polycarbonate with the characteristics as set forth in Table 2 was prepared in a continuous polycarbonate plant. The molten polymer resulting from the last polymerization stage was fed into a 6 barrel, L/D=21, twin screw extruder where it was blended with the additives listed in Table 1. The resulting product was melt filtered, strained, and pelletized.

TABLE 2

Properties of polycarbonate prepared according to melt polymerization methods

| | Melt Polycarbonate Composition |
|---|---|
| Melt volume rate (MVR, cm$^3$/10 minutes) | 18-22 |
| Molecular weight (Mw) | 42500-45000 |
| Fries concentration (ppm) | <800 |
| End cap level (%) | 74%-81% |

The melt volume rate (MVR) was determined according to ISO 1133 at 1.2 (kilogram) kg/300° C. The molecular weight was determined according to polystyrene standards.

Fries content or concentration was measured by the potassium hydroxide (KOH) methanolysis of the polycarbonate composition and is reported as parts per million by weight (ppm). The Fries content for each of the melt polycarbonates was determined as follows. First, 0.30 grams of polycarbonate was dissolved in 5.0 ml of tetrahydrofuran (THF) (containing p-terphenyl as internal standard). Next, 2.6 ml of 10% KOH in methanol was added to this solution. The resulting mixture was stirred for two hours at ambient temperature. Next, 1.0 ml of acetic acid was added and the mixture was stirred for 5 minutes. Potassium acetate by-product was allowed to crystalline over one hour. The solid was filtered off and the resulting filtrate was analyzed by liquid chromatography using p-terphenyl as the internal standard.

Samples of the interfacial polymerization compositions were prepared and samples of melt polymerization compositions (GTS) were prepared at varying fries concentrations. Fries concentration can be adjusted according to the type of catalyst, temperature, and residence employed during the polymerization reaction.

The phenolic group content (OH) was determined by measuring the ultraviolet (UV) absorption of the OH group present in the polycarbonate composition using the Beer-Lambert law and referring to calibration standards. The end cap level (EC %) was determined by the measurement of the OH groups concentration and the polycarbonate resin molecular weight. The ratio of the OH group content referred to the total end groups of the polycarbonate provides the EC %. A higher EC % value indicates a lower concentration of OH endgroups.

Pellets of the polycarbonate polymers were formed via extrusion and were dried at about 110° C. for at least four hours prior to molding the pellets into test samples. The injection molding conditions were carried out at a nozzle temperature of 295° C. and a mold temperature of 100° C.

Notched Izod impact tests were performed according to INI ISO 180 on 4 mm, molded plaque sample sets of polycarbonate composition prepared according to interfacial and melt polymerization methods. Comparative Sample 1 (CS1) provides a polycarbonate composition prepared according to interfacial polymerization methods. Sample set 1A provides a polycarbonate composition prepared according to the melt transesterification processes described herein and including GTS at 400 ppm as mold release agent. Sample set 1B provides a polycarbonate composition prepared according the melt transesterification processes described herein and including PETS at 3000 ppm as the mold release agent. Sample sets 1A and 1B both further include a fries content of 1000 ppm and the UV absorber additive UV5411 at 2700 ppm. The MVR for CS1, 1A, and 1B was 19 cm$^3$/10 min, 21, and 21, respectively. Table 3 shows the impact of the additives on the polycarbonate compositions prepared according to melt polymerization methods and including either PETS or GTS as the mold release agent test at complete rupture (type C).

TABLE 3

Impact performance of interfacial polycarbonates and melt polycarbonates with differeing mold release agent.

| | Sample | Height 1 | Height 2 | Base | Area (mm$^2$) | Energy (J) | Type | Izod (KJ/m$^2$) |
|---|---|---|---|---|---|---|---|---|
| CS1 | 1 | 8.00 | 8.00 | 4.11 | 32.88 | 0.378 | C | 11.50 |
| | 2 | 8.00 | 8.00 | 4.11 | 32.88 | 0.364 | C | 11.07 |
| | 3 | 8.00 | 8.00 | 4.12 | 32.96 | 0.334 | C | 10.13 |
| | 4 | 8.00 | 8.00 | 4.11 | 32.88 | 0.406 | C | 12.35 |
| | 5 | 8.00 | 8.00 | 4.11 | 32.88 | 0.364 | C | 11.07 |
| | 6 | 8.00 | 8.00 | 4.12 | 32.96 | 0.372 | C | 11.29 |
| | 7 | 8.00 | 8.00 | 4.11 | 32.88 | 0.404 | C | 12.29 |
| | 8 | 8.00 | 8.00 | 4.12 | 32.96 | 0.383 | C | 11.62 |
| | 9 | 8.00 | 8.00 | 4.12 | 32.96 | 0.353 | C | 10.71 |
| | 10 | 8.00 | 8.00 | 4.12 | 32.96 | 0.381 | C | 11.56 |
| | Avg. | 8.00 | 8.00 | 4.12 | 32.92 | 0.37 | C | 11.36 |
| | Std. Dev. | 0.00 | 0.00 | 0.01 | 32.92 | 0.02 | C | 0.67 |
| 1A (GTS) | 1 | 8.00 | 8.00 | 4.12 | 32.96 | 0.301 | C | 9.13 |
| | 2 | 8.00 | 8.00 | 4.13 | 33.04 | 0.377 | C | 11.41 |
| | 3 | 8.00 | 8.00 | 4.12 | 32.96 | 0.342 | C | 10.38 |
| | 4 | 8.00 | 8.00 | 4.12 | 32.96 | 0.318 | C | 9.65 |
| | 5 | 8.00 | 8.00 | 4.13 | 33.04 | 0.383 | C | 11.59 |

TABLE 3-continued

Impact performance of interfacial polycarbonates and melt polycarbonates with differeing mold release agent.

| Sample | | Height 1 | Height 2 | Base | Area (mm²) | Energy (J) | Type | Izod (KJ/m²) |
|---|---|---|---|---|---|---|---|---|
| | 6 | 8.00 | 8.00 | 4.13 | 33.04 | 0.344 | C | 10.41 |
| | 7 | 8.00 | 8.00 | 4.11 | 32.88 | 0.334 | C | 10.16 |
| | 8 | 8.00 | 8.00 | 4.13 | 33.04 | 0.318 | C | 9.62 |
| | 9 | 8.00 | 8.00 | 4.12 | 32.96 | 0.323 | C | 9.80 |
| | 10 | 8.00 | 8.00 | 4.12 | 32.96 | 0.366 | C | 11.10 |
| | Avg. | 8.00 | 8.00 | 4.12 | 32.98 | 0.34 | C | 10.33 |
| | Std. Dev. | 0.00 | 0.00 | 0.01 | 0.05 | 0.01 | C | 0.82 |
| 1B (PETS) | 1 | 8.00 | 8.00 | 4.12 | 32.96 | 0.332 | C | 10.07 |
| | 2 | 8.00 | 8.00 | 4.12 | 32.96 | 0.294 | C | 8.92 |
| | 3 | 8.00 | 8.00 | 4.13 | 33.04 | 0.321 | C | 9.72 |
| | 4 | 8.00 | 8.00 | 4.12 | 32.96 | 0.298 | C | 9.04 |
| | 5 | 8.00 | 8.00 | 4.13 | 33.04 | 0.309 | C | 9.35 |
| | 6 | 8.00 | 8.00 | 4.12 | 32.96 | 0.292 | C | 8.86 |
| | 7 | 8.00 | 8.00 | 4.13 | 33.04 | 0.314 | C | 9.50 |
| | 8 | 8.00 | 8.00 | 4.11 | 32.88 | 0.301 | C | 9.15 |
| | 9 | 8.00 | 8.00 | 4.12 | 32.96 | 0.292 | C | 8.86 |
| | 10 | 8.00 | 8.00 | 4.13 | 33.04 | 0.307 | C | 9.29 |
| | Avg. | 8.00 | 8.00 | 4.12 | 32.98 | 0.31 | C | 9.28 |
| | Std. Dev. | 0.00 | 0.00 | 0.01 | 0.05 | 0.01 | C | 0.40 |

FIG. 1 provides a graphical interpretation of the impact performance data obtained and presented in Table 3. Samples 1A prepared with GTS as the release agent exhibited better impact strength behavior when compared with Samples 1B having PETS. Furthermore, the Samples 1A exhibited strength values comparable to those of the interfacial polycarbonate compositions samples CS1.

Figure 2:
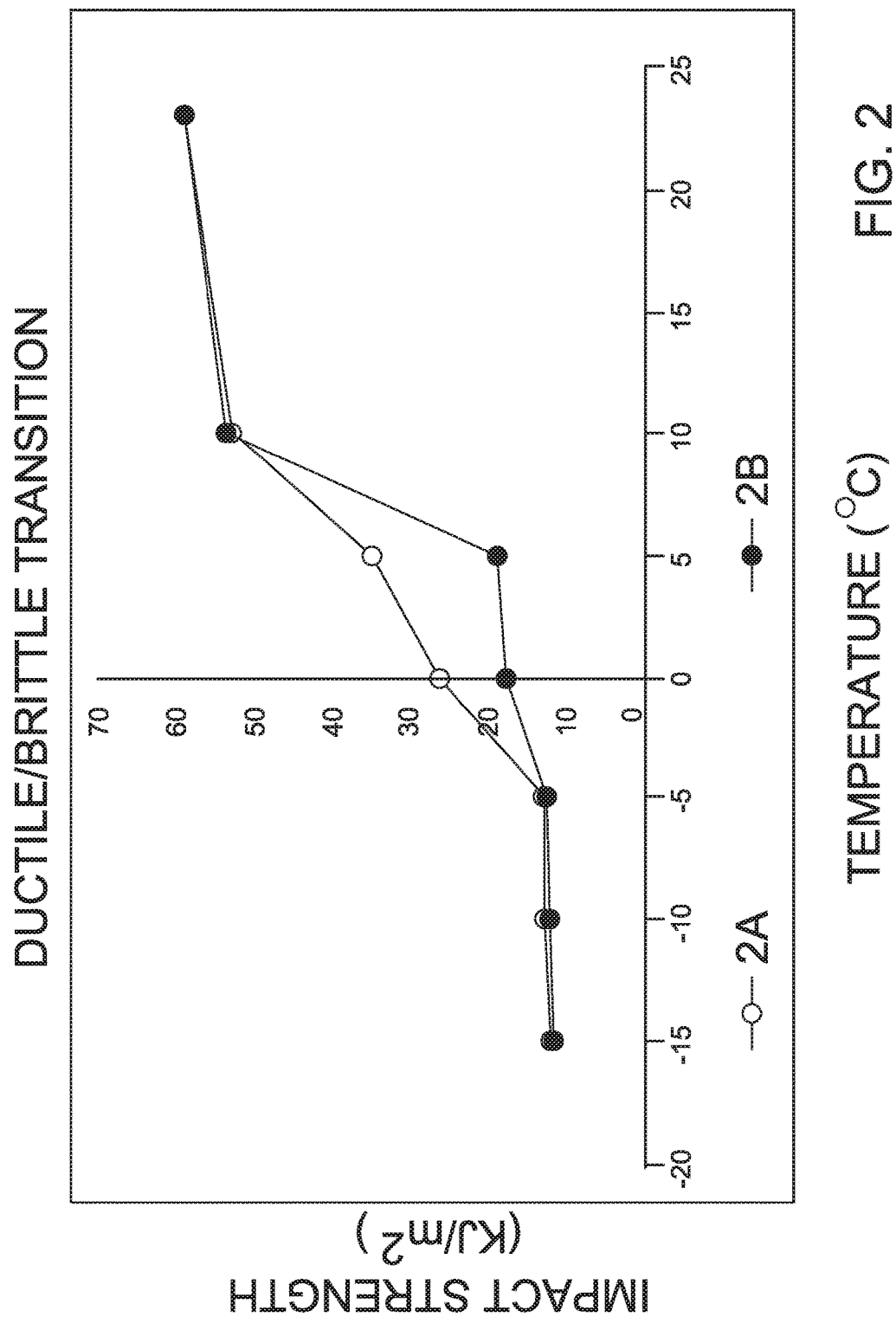
FIG. 2 is a graph of ductule/brittle transition data for comparative and/or example compositions according to aspects of the disclosure.

Ductile/brittle transition behavior was observed for melt polycarbonate compositions prepared with either GTS (sample 2A) or PETS (sample 2B) at 1500 ppm. FIG. 2 provides a diagram of the ductile/brittle transition data of samples having the same concentration of release agent. As shown, the values are comparable, but sample 2A (GTS) exhibited higher values at from −5° C. to 10° C. Ductile/brittle transition was measured according to ISO 180 at 3 mm.

Figure 3:
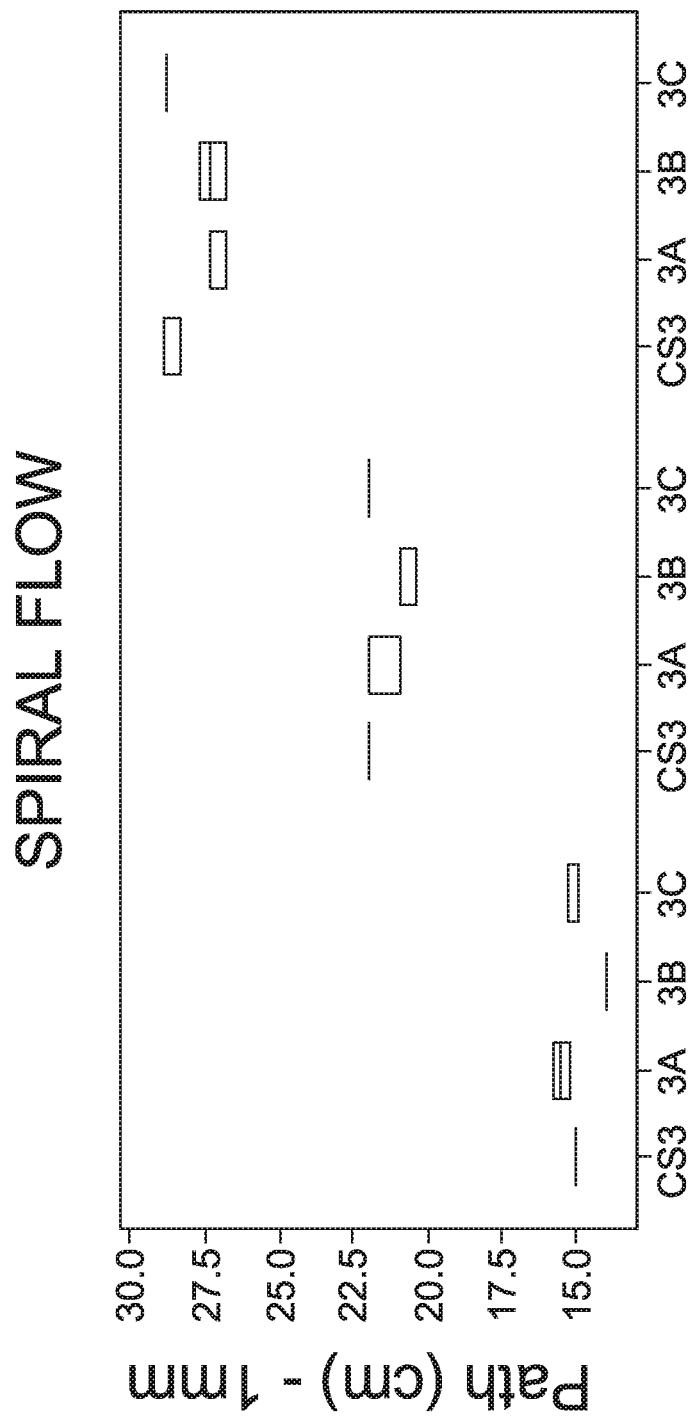
FIG. 3 is a graphical representation of spiral flow data for comparative and/or example compositions according to aspects of the disclosure.

Spiral Flow performance of the compositions was also evaluated according to a standard "spiral flow procedure" at varying injection pressures. The test was performed on an injection moulding machine under the conditions specified in Table 4 using a mold having an open-ended cavity cut into one half. This is a method of evaluating the molding flow of a resin to injection or transfer molding in which the melt is injected into a spiral runner of constant trapezoidal cross section with numbered and subdivided centimeters (or inches) marked along the runner. The mold is filled from a sprue at the center of the spiral and pressure is maintained until flow stops, the number just aft of the molded-spiral tip giving the flow distance. After ejection the spiral was measured and the value provided as the spiral flow length in centimeters. A comparative sample prepared according to interfacial polymerization (comparative sample 3, CS3) and melt polymerization samples at 3000 ppm PETS (sample 3A), 1300 ppm GTS (sample 3B), and at 300 ppm GTS (sample 3C) were evaluated for flow at varying injection pressures. FIG. 3 presents that GTS melt polymerization polycarbonate compositions achieved the flow behavior of interfacial polycarbonate compositions. At each injection pressure, samples 3A-3C exhibited a spiral flow comparable to that of CS3.

TABLE 4

Spiral flow test settings

| | Parameters |
|---|---|
| Shot volume (cubic centimeters, cm³) | 35.3 |
| Screw speed (meters per minute, m/min) | 11.3 |
| Sp. back pressure(bar) | 36 |
| Decompression (cm³) | 0 |
| Injection rate (cubic centimeters per second, cm³/s) | 28 |
| Holding pressure (bar) | 0 |
| Holding time (seconds, s) | 0 |
| Cooling time (s) | 15 |
| Cycle time (s) | 19.5 |

Figure 4:
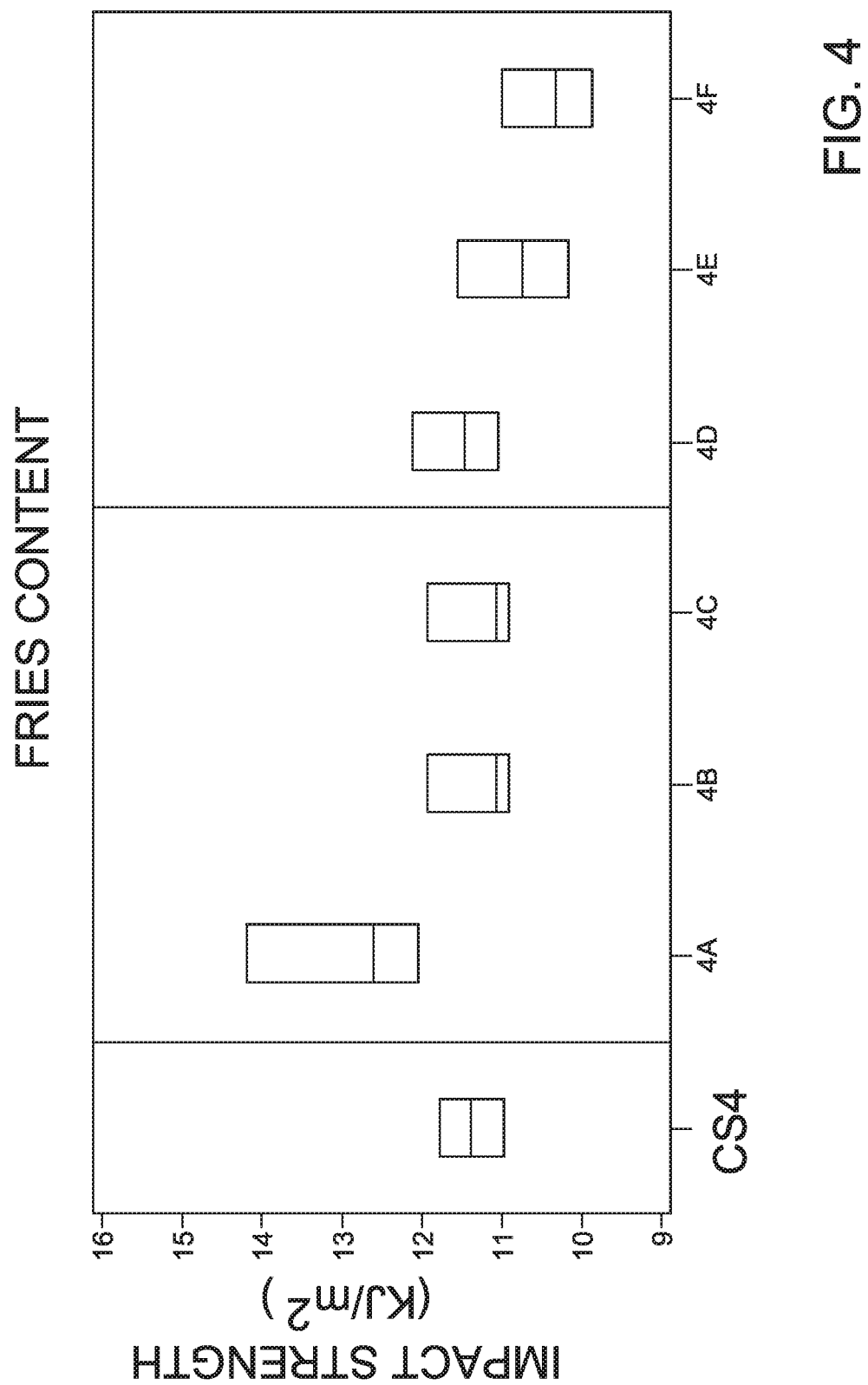
FIG. 4 is a graphical representation of impact performance behavior of samples having varying levels of Fries content.

FIG. 4 presents the impact performance behavior of samples having varying levels of fries concentration (800 ppm and 1100 ppm) of the polycarbonate composition viscosity range provided herein (18 cm³/10 min. to 22 cm³/10 min.). All samples 4A through 4F included GTS at 400 ppm and UV absorber Tin360 at 1700 ppm. Samples 4A, 4B, and 4C corresponded to melt polymerization polycarbonate compositions having a fries concentration of 800 ppm and viscosities of 18 cm³/10 min., 20 cm³/10 min., and 22 cm³/10 min., respectively. Samples 4D, 4E, and 4F corresponded to melt polymerization PC compositions having a fries concentration of 1100 ppm and viscosities of 18, 20, and 22, respectively. As shown, samples 4A, 4B, and 4C at a lower fries concentration level (800 ppm) exhibited an improvement in impact strength when compared to samples prepared according to an interfacial polymerization method, comparative sample CS4, and 20 cm³/10 min. viscosity. At 1100 ppm, the impact strength values for the GTS melt polymerization samples were comparable to those of the interfacial polymerization samples, but did not improve upon the impact strength performance.

Figure 5:
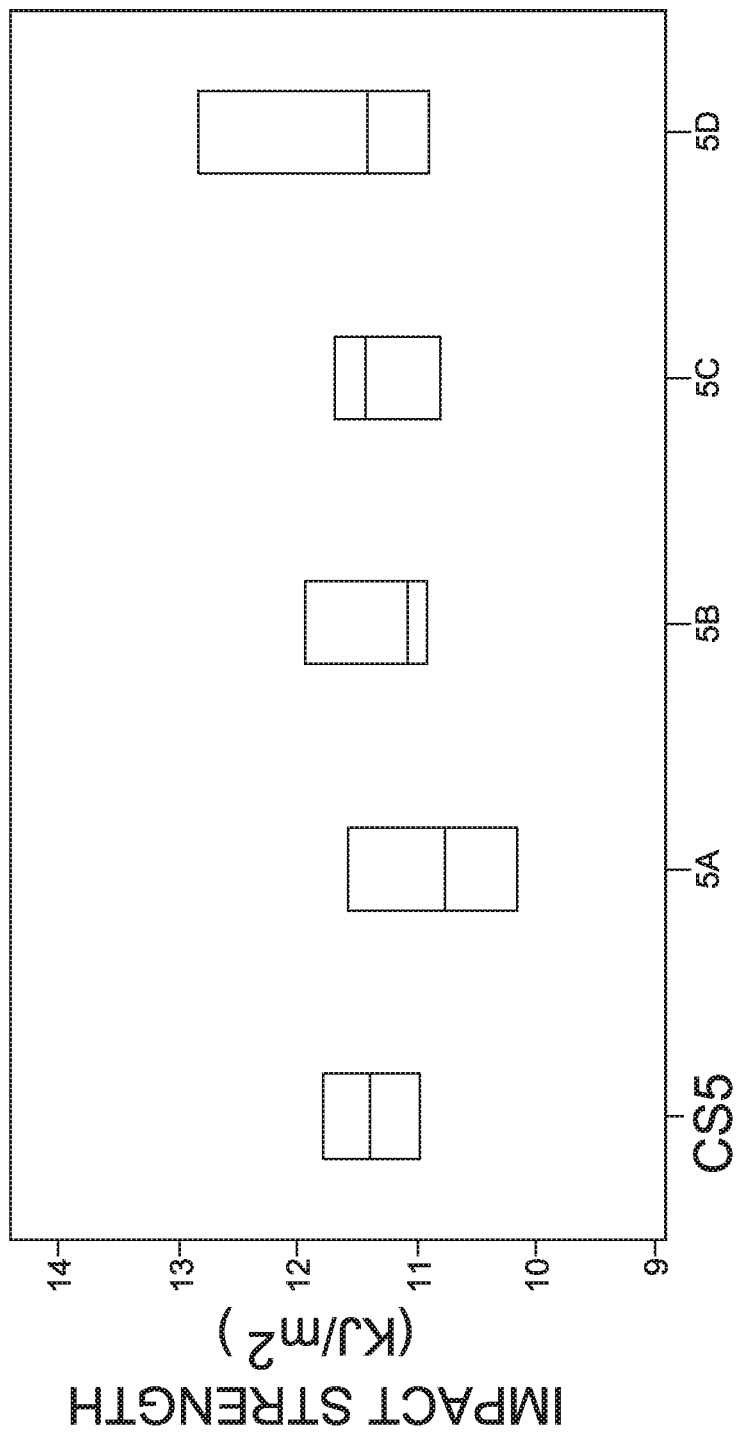
FIG. 5 is another graphical representation of impact performance behavior of samples having varying levels of Fries content.

FIG. 5 presents impact performance behavior of GTS (400 ppm) melt polymerization samples at a range of fries concentrations from 250 ppm to 1100 ppm. The melt polymerization samples 5A through 5D had a flow rate of 20 cm³/10 min. and the comparative interfacial polymerization samples CS5 had a flow rate of 19 cm³/10 min. Samples 5A, 5B, 5C, and 5D had fries concentrations at 1100 ppm, 800 ppm, 350 ppm, and 250 ppm, respectively. As shown, maintaining the fries concentration below 800 ppm (5B to 5D) allows for the GTS melt polymerization samples to exhibit impact strength behavior at values of from about 11 KJ/m2 to about 12.5 KJ/m$^2$ comparable to those of the interfacial polymerization at values of from about 11 KJ/m$^2$ to about 12 KJ/m$^2$. The GTS melt polymerization samples 5A having a fries concentration at 1100 ppm appear to have a slightly lower range for impact strength behavior with values at from about 10 KJ/m$^2$ to about 11.5 KJ/m$^2$.

Figure 6:
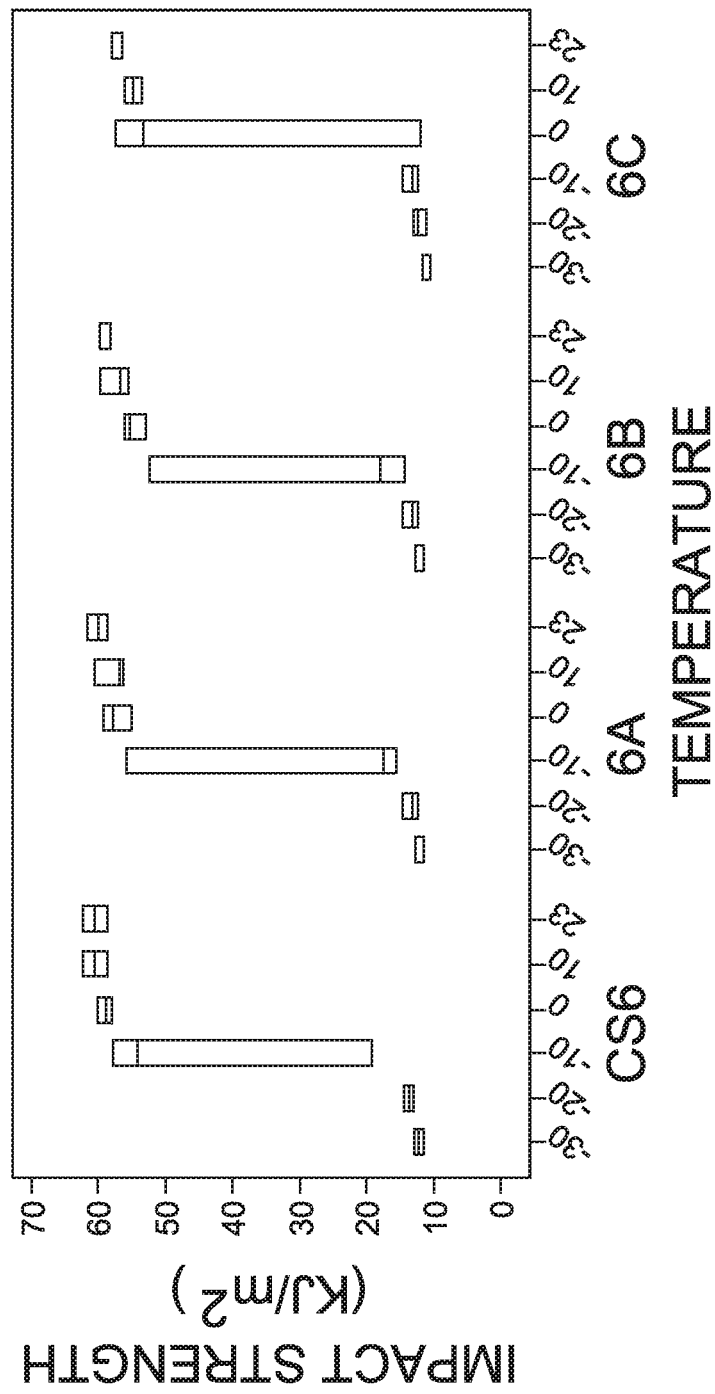
FIG. 6 is a graphical representation of impact performance data for comparative and/or example compositions according to aspects of the disclosure.

Samples were also evaluated for the effect of the end cap level of the composition on impact behavior. For polycarbonate compositions prepared according to interfacial polymerization methods (CS6), the EC % refers to the proportion of phenol and p-cumylphenol. For melt polycarbonate composition samples 6A, 6B, and 6C, the endcap level was measured as the percentage (EC %) of phenol/bisphenol A (BPA) groups present in the melt polycarbonate composition chains. The endcap levels were 76%, 81%, and 88% for samples 6A, 6B, and 6C, respectively. Higher EC % values are indicative of a higher proportion of phenol end groups. At the viscosity range evaluated herein (18-22), the p-cumylphenol (PCP) to phenol ratio may be very high. Higher amounts of BPA or PCP in the polycarbonate compositions may improve impact performance because of the increase of free volume in the polycarbonate composition. As shown in FIG. 6, a GTS melt polymerization polycarbonate having an EC % at less than 81% phenol (samples 6A and 6B) exhibited comparable impact behavior to an interfacial polymerization polycarbonate composition (CS6) when observing ductile/transition behavior from −30° C. to ambient temperatures (about 23° C.).

Figure 7:
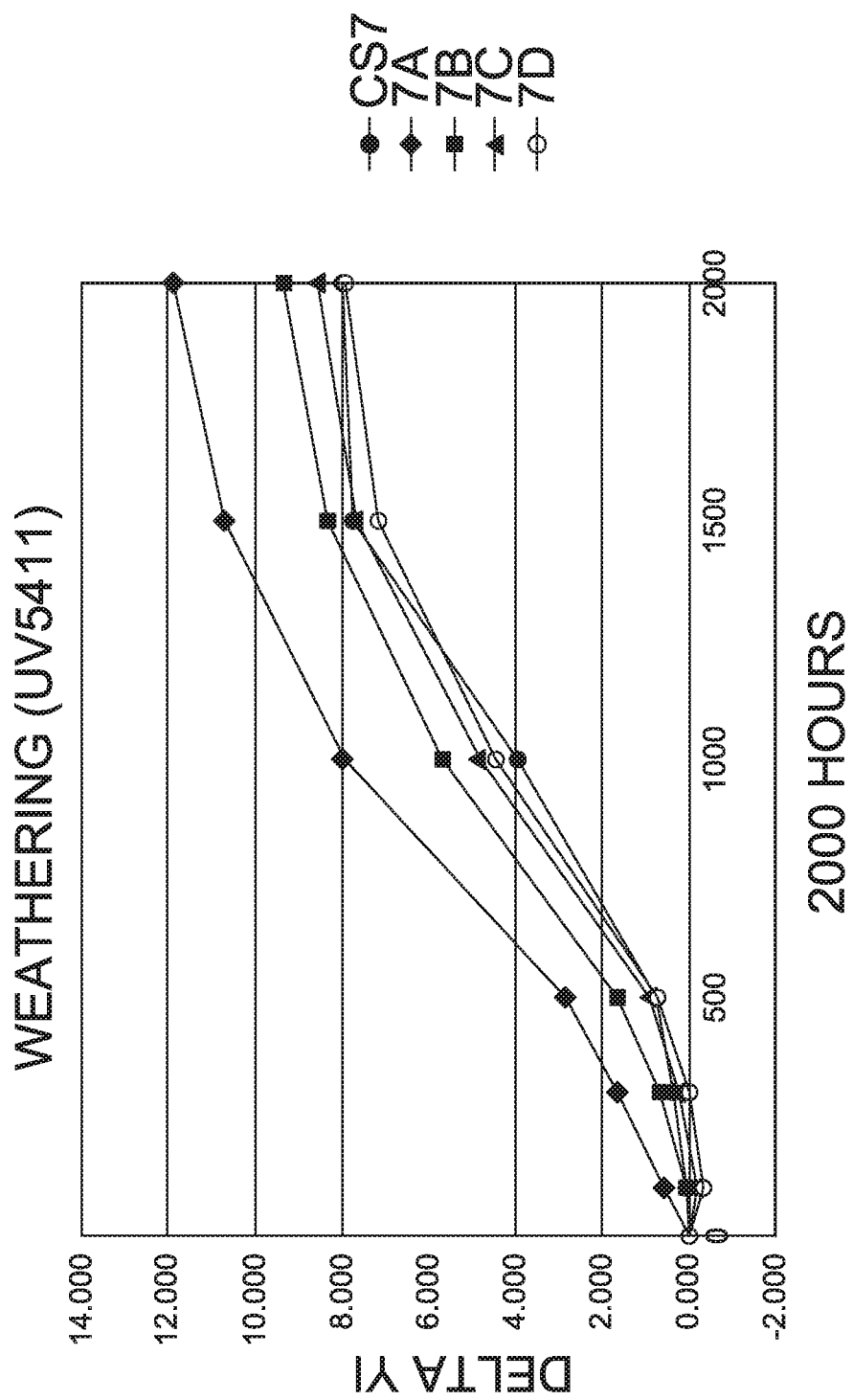
FIG. 7 is a graphical representation of weathering data for comparative and/or example compositions according to aspects of the disclosure.

Outdoor weathering resistance of the melt polycarbonate compositions was also evaluated at varying type and concentrations of ultraviolet additives. An accelerated outdoor weathering test according to ISO 4892 was performed on comparative samples of interfacial polymerization (CS7) polycarbonate samples of melt polymerization polycarbonate compositions at varying levels of UV5411; sample 7A at 400 ppm UV5411; sample 7B, 1500 ppm UV5411; sample 7C, 2000 ppm UV5411; and 7D, 2700 ppm UV5411. Samples were mounted in the weathering apparatus and subjected to a cycle of exposure to intense ultraviolet radiation followed by moisture exposure according to the procedure ISO 4892-Day Light Test. Higher values for the change in the Yellowness Index (Delta YI) over time corresponded to increased weathering. As shown in FIG. 7, melt polymerization samples 7B to 7D exhibited accelerated weathering behavior comparable to that exhibited by CS7. As such, melt polymerization compositions having a UV5411 concentration greater than about 2000 ppm may exhibit comparable weathering behavior to a similar polycarbonate prepared according to an interfacial polymerization method. Table 5 provides the weathering test parameters for the two phases (with and without rain) observed.

TABLE 5

Accelerated outdoor weathering test parameters according to ISO 4892.

|  | Phase 1 | Phase 2 |
|---|---|---|
| Irradiance (Watts per square meter W/m$^2$) | 60 | 60 |
| E (KJL/m$^2$) | 216 | 216 |
| T control | C/B (please define) | C/B (please define) |
| Chamber temperature | 41 | 65 |
| BST ° C. | 65 | On |

Figure 8:
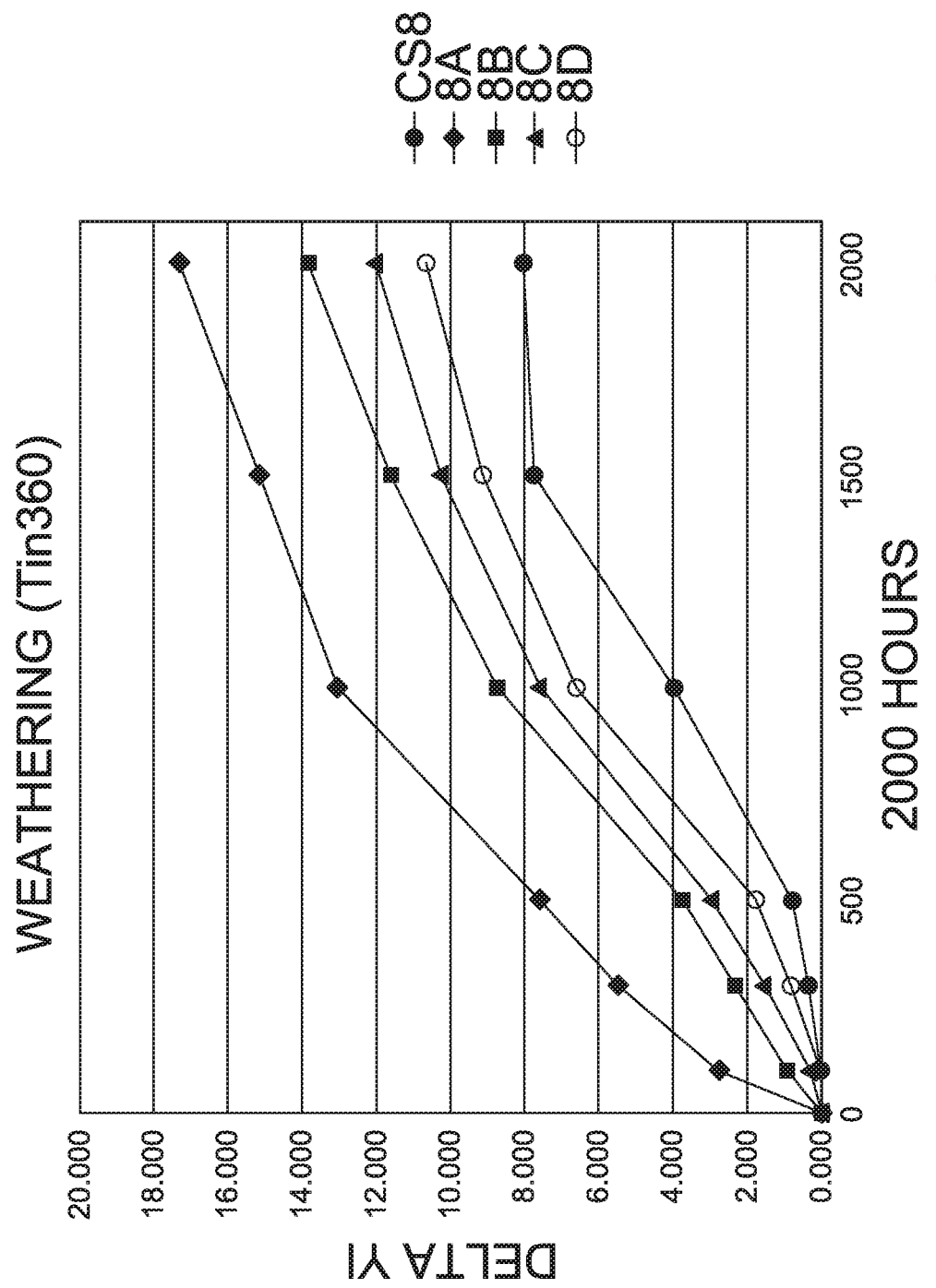
FIG. 8 is another graphical representation of weathering data for comparative and/or example compositions according to aspects of the disclosure.

FIG. 8 provides accelerated weathering test for a comparative interfacial polymerization sample (CS8) and for melt polymerization polycarbonate samples at varying levels Tin360 (a UV5411 dimer); sample 8A at 0 ppm Tin360; sample 8B, 400 ppm Tin360; sample 8C, 800 ppm Tin360; and sample 8D, 1500 ppm Tin360. Of samples 8A through 8D, sample 8D exhibited an accelerated weathering profile closest to that of CS8.

Figure 9:
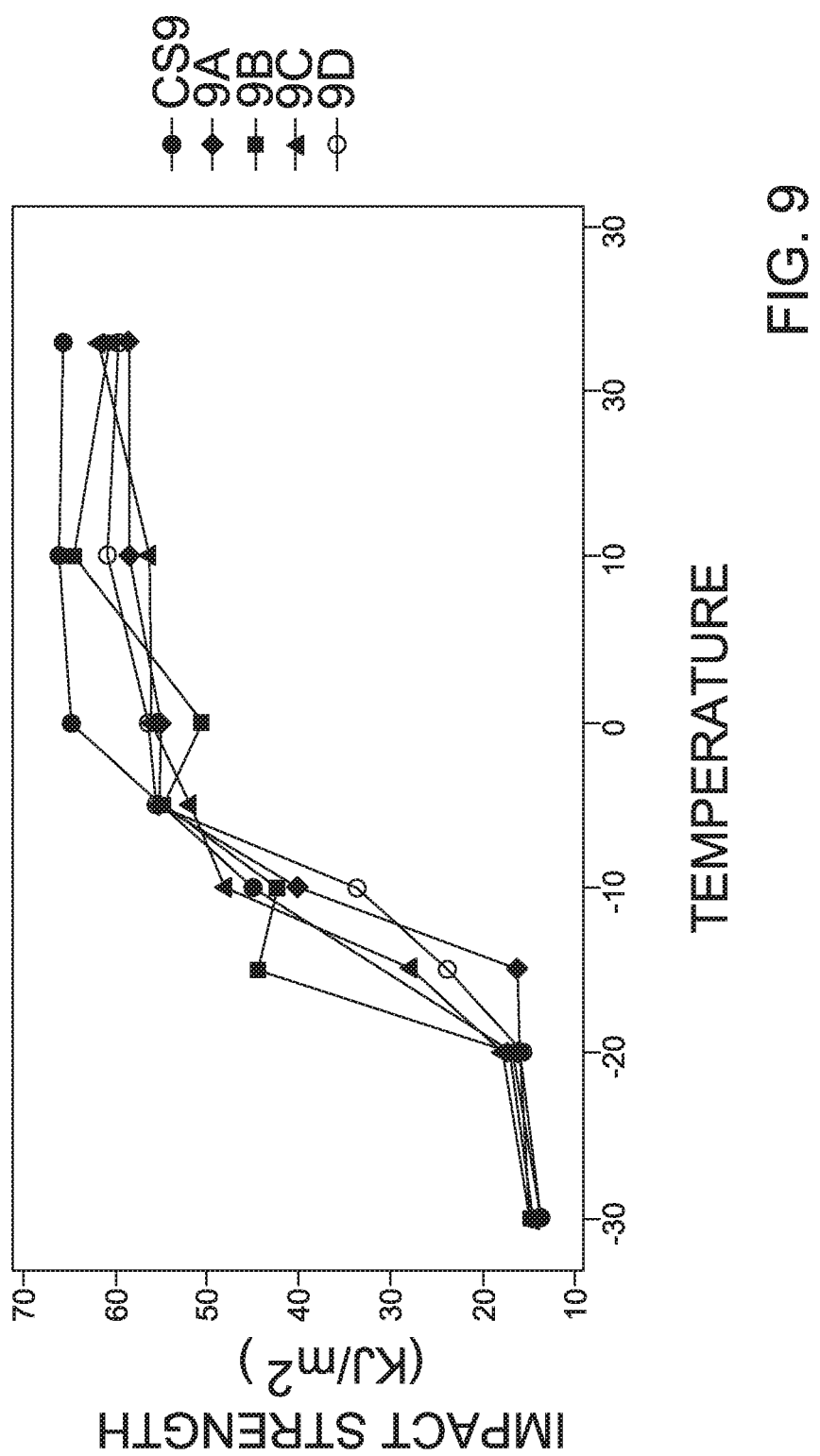
FIG. 9 is a graphical representation of impact performance data for comparative and/or example compositions according to aspects of the disclosure.

In FIG. 9, melt polymerization samples 9A to 9D were formulated at varying fries concentrations and having GTS at 400 ppm and UV5411 at 2000 ppm and the ductile/brittle transition temperature under the ISO 180 norm (norm accounts for the energy used to heat the sample) at 3 mm and compared to the current interfacial polymerization polycarbonate composition (CS9). No significant differences were observed between the melt samples 9A to 9D and CS9. Thus, melt polymerization polycarbonate compositions having similar performance profiles to an interfacial polymerization polycarbonate composition were achieved where PETS was replaced with GTS, the fries concentration level was maintained below 800 ppm, and the EC % held below 81% for the viscosity range 18 cm$^3$/10 min. to 22 cm$^3$/10 min.

Figure 10:
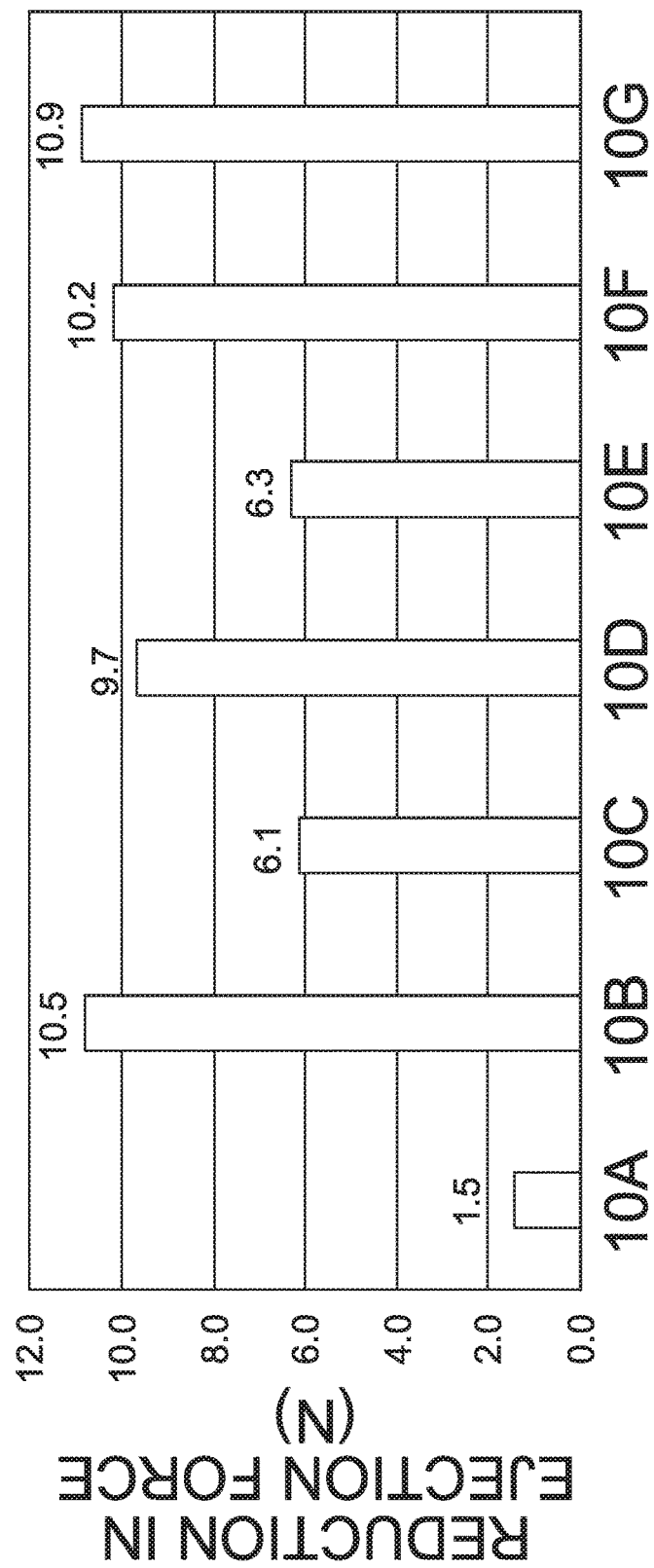
FIG. 10 is a graphical representation showing the reduction of ejection force as a measure of the equivalents of a given additive component for comparative and/or example compositions according to aspects of the disclosure.

Samples were also evaluated to assess the impact of the GTS or PETS as a mold release agent by examining the effect of the additive on the ejection force used to eject the resin composition from a mold. FIG. 10 provides a diagram showing the reduction of ejection force as a measure of the equivalents of a given additive component (PETS or GTS). Resin composition Sample 10A is 0.1 equivalents PETS; 10B is 0.2 equivalents PETS; 10C is 0.1 equivalents GTS; 10D is 0.2 equivalents GTS; 10E is a combination of 0.1 equivalents PETS and 0.1 equivalents GTS; 10F is a combination of 0.2 equivalents PETS and 0.1 equivalents of GTS; and 10G is 0.3 equivalents of PETS. As shown, Sample 10A having only 0.1 equivalents PETS exhibited the lowest reduction in ejection force at 1.5 Newton (N). Generally, samples containing GTS (10C, 10D, 10E, and 10F) showed significantly higher values for the reduction in ejection force.

It will be apparent to those skilled in the art that various modifications and variations can be made in the present disclosure without departing from the scope or spirit of the disclosure. Other aspects of the disclosure will be apparent to those skilled in the art from consideration of the specification and practice of the disclosure disclosed herein. It is intended that the specification and examples be considered as exemplary only, with a true scope and spirit of the disclosure being indicated by the following claims.

The patentable scope of the disclosure is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed:

1. An article formed from a composition comprising:
a melt polycarbonate resin derived from diphenyl carbonate; and
glycerol tristearate mixed with the melt polycarbonate resin,
wherein the melt polycarbonate resin exhibits a melt volume rate of between about 18 cm$^3$/10 minutes and about 22 cm$^3$/10 minutes,
wherein the melt polycarbonate resin exhibits a fries concentration below about 800 ppm,
wherein the article formed from the composition exhibits an Izod impact performance between about 9.5 KJ/m$^2$ and about 13 KJ/m$^2$ based on ISO 180 at 4 mm thickness at room temperature, and
wherein the article formed from the composition exhibits weathering values of less than about 12 Delta Yellowness Index for an exposure time of 2000 hours when tested in accordance with ISO 4892.

2. The article of claim 1, wherein the article comprises an automotive lighting lens.

3. The article of claim 1, wherein the composition further comprises a UV protection additive.

4. The article of claim 3, wherein the UV protection additive comprises 2-(2 hydroxy-5-t-octylphenyl) benzotriazole.

5. The article of claim 1, wherein the composition further comprises tris(2,4-di tertbutylphenyl) phosphite.

6. The article of claim 1, wherein the composition further comprises octadecyl-3-(3,5-di-tert-butyl-4-hydroxyphenyl) propionate.

7. The article of claim 1, wherein the composition further comprises tetrabutyl phosphonium per fluoro-butylsulfonate.

8. The article of claim 1, wherein the composition further comprises a quenching agent.

9. The article of claim 8, wherein the quenching agent comprises n-butyl p-toluenesulfonate.

10. The article of claim 1, wherein the composition includes an end cap level of less than 81%.

11. A method comprising:
forming a polycarbonate resin by a melt transesterification process;
mixing glycerol tristearate with the polycarbonate resin to form a composition; and
forming an article from the composition,
wherein the polycarbonate resin exhibits a melt volume rate of between about 18 cm$^3$/10 minutes and about 22 cm$^3$/10 minutes,
wherein the polycarbonate resin exhibits a fries concentration below about 800 ppm,
wherein the article formed from the composition exhibits an Izod impact performance between about 9.5 KJ/m$^2$ and about 13 KJ/m$^2$ based on ISO 180 at 4 mm thickness at room temperature, and
wherein the article formed from the composition exhibits weathering values of less than about 12 Delta Yellowness Index for an exposure time of 2000 hours when tested in accordance with ISO 4892.

12. The method of claim 11, wherein the article comprises an automotive lighting lens.

13. The method of claim 11, further comprising mixing a UV protection additive with at least the polycarbonate resin to form the composition.

14. The method of claim 13, wherein the UV protection additive comprises 2-(2 hydroxy-5-t-octylphenyl) benzotriazole.

15. The method of claim 11, further comprising mixing tris(2,4-di tertbutylphenyl) phosphite with at least the polycarbonate resin to form the composition.

16. The method of claim 11, further comprising mixing octadecyl-3-(3,5-di-tert-butyl-4-hydroxyphenyl)propionate with at least the polycarbonate resin to form the composition.

17. The method of claim 11, further comprising mixing tetrabutyl phosphonium per fluoro-butylsulfonate with at least the polycarbonate resin to form the composition.

18. The method of claim 11, further comprising mixing a quenching agent with at least the polycarbonate resin to form the composition.

19. The method of claim 18, wherein the quenching agent comprises n-butyl p-toluenesulfonate.

* * * * *